United States Patent
Liu et al.

(10) Patent No.: US 10,731,773 B2
(45) Date of Patent: Aug. 4, 2020

(54) WATER SOFTENER VALVE AND WATER SOFTENER

(71) Applicants: WUHU MIDEA KITCHEN AND BATH APPLIANCES MFG. CO., LTD., Wuhu (CN); MIDEA GROUP CO., LTD., Foshan (CN)

(72) Inventors: Guohua Liu, Foshan (CN); Zhifeng He, Foshan (CN)

( * ) Notice: Subject to any disclaimer, the term of this patent is extended or adjusted under 35 U.S.C. 154(b) by 95 days.

(21) Appl. No.: 16/179,894

(22) Filed: Nov. 3, 2018

(65) Prior Publication Data

US 2019/0072207 A1 Mar. 7, 2019

(30) Foreign Application Priority Data

Apr. 28, 2018 (CN) .......................... 2018 1 0413974
Apr. 28, 2018 (CN) ...................... 2018 2 0649151 U

(51) Int. Cl.
| | |
|---|---|
| *C02F 1/42* | (2006.01) |
| *F16K 31/524* | (2006.01) |
| *F16K 31/53* | (2006.01) |
| *F16K 31/16* | (2006.01) |
| *C02F 1/52* | (2006.01) |

(Continued)

(52) U.S. Cl.
CPC ......... *F16K 31/52475* (2013.01); *B01J 49/85* (2017.01); *C02F 1/42* (2013.01); *C02F 1/5245* (2013.01); *C02F 5/00* (2013.01); *F16K 11/0712* (2013.01); *F16K 11/18* (2013.01); *F16K 27/041* (2013.01); *F16K 31/16* (2013.01); *F16K 31/53* (2013.01); *C02F 2201/005* (2013.01); *C02F 2209/40* (2013.01); *C02F 2303/16* (2013.01)

(58) Field of Classification Search
None
See application file for complete search history.

(56) References Cited

U.S. PATENT DOCUMENTS

| | | | |
|---|---|---|---|
| 6,596,159 B1 | 7/2003 | Maruyama et al. | |
| 2007/0262024 A1* | 11/2007 | Gruett | B01J 49/85 210/670 |
| 2016/0341323 A1* | 11/2016 | Wu | B01D 35/04 |

FOREIGN PATENT DOCUMENTS

| | | |
|---|---|---|
| CN | 202266706 U | 6/2012 |
| CN | 206600510 U | 10/2017 |

OTHER PUBLICATIONS

International Search Report dated Jan. 21, 2019 corresponding to International Application No. PCT/CN2018/111150.

* cited by examiner

*Primary Examiner* — Matthew O Savage
(74) *Attorney, Agent, or Firm* — Kilpatrick Townsend & Stockton, LLP

(57) ABSTRACT

The present disclosure discloses a water softener valve and a water softener, the water softener valve includes a valve body, including a valve cavity, a water inlet passage that is communicated with the valve cavity, a forward washing passage, a backwashing passage, an ejecting passage, a softening inlet passage, a softening outlet passage, a waste water passage, and a saline solution suction passage; a valve core assembly is provided with a forward washing position and a backwashing washing position, at the forward washing position; and a switching unit, the switching unit is defined to communicate the forward washing passage with the ejecting passage, when the valve core assembly is at the forward washing position; and to communicate the backwashing passage with the ejecting passage, when the valve core assembly is at the backwashing position.

20 Claims, 26 Drawing Sheets

(51) Int. Cl.
*F16K 11/18* (2006.01)
*F16K 27/04* (2006.01)
*F16K 11/07* (2006.01)
*B01J 49/85* (2017.01)
*C02F 5/00* (2006.01)

WATER SOFTENER VALVE AND WATER SOFTENER

CROSS-REFERENCE TO RELATED APPLICATIONS

This application claims a priority to and benefits of Chinese Patent Application Serial No. 201810413974.0 and 201820649151.3, filed with the State Intellectual Property Office of P. R. China on Apr. 28, 2018, the entire contents of which are incorporated herein by reference.

FIELD OF THE DISCLOSURE

The disclosure relates to the technical field of water treatment equipment, and in particular, to a water softener valve and a water softener.

BACKGROUND OF THE DISCLOSURE

Water softener can soften water, thereby improving user's experience on water quality, saving detergent and water, and so on. A core component of the water softener is water softener valve. One of the functions that the water softener valve has is to control the process of saline solution suction and regeneration of the water softener. There are commonly two modes of saline solution suction and regeneration, one is saline solution suction to backwash and the other is saline solution suction to forward wash. Each has its merits and demerits. Users can choose the modes of saline solution suction according to personal requirements and different stages, making the water softener to exert its best softening efficiency. However, the current water softener valve can not realize the functions of saline solution suction to forward wash and saline solution suction to backwash at the same time. If users want to switch the mode of saline solution suction and regeneration, it is required to replace the whole water softener valve.

SUMMARY OF THE DISCLOSURE

The main object of the present disclosure is to provide a water softener valve, to solve the technical problem that the current water softener valve can only realize a single mode of saline solution suction and regeneration and cannot be switched between the mode of saline solution suction to forward wash and the mode of saline solution suction to backwash.

In order to achieve the above object, the present disclosure provide a water softener valve, the water softener valve includes:

a valve body, including a water inlet passage, a forward washing passage, a backwashing passage and an ejecting passage, all communicating with the valve cavity; a saline solution suction passage, communicating with an ejection outlet of the ejecting passage; and a softening inlet passage, a softening outlet passage and a waste water passage, all communicating with the valve cavity; the forward washing passage and the backwashing passage both connecting with the ejecting passage;

a valve core assembly, provided with a forward washing position and a backwashing position, cooperated with the valve cavity, at the forward washing position, the valve core assembly is defined to communicate the water inlet passage with the forward washing passage, the ejecting passage with the softening inlet passage, and the softening outlet passage with the waste water passage; at the backwashing position, the valve core assembly is defined to communicate the water inlet passage with the backwashing passage, the ejecting passage with the softening outlet passage, and the softening inlet passage with the waste water passage; and a switching unit, the switching unit is defined to communicate the forward washing passage with the ejecting passage, when the valve core assembly is at the forward washing position; and, communicating the backwashing passage with the ejecting passage, when the valve core assembly is at the backwashing position.

In one embodiment, the ejecting passage includes an forward washing ejecting passage and an backwashing ejecting passage, each communicating with the valve cavity; the forward washing ejecting passage is connected with the forward washing passage, the backwashing ejecting passage is connected with the backwashing passage, each outlet of the forward washing ejecting passage and the backwashing ejecting passage is communicated with the saline solution suction passage;

at the forward washing position, the valve core assembly is further defined to communicate the forward washing ejecting passage with the softening inlet passage; and at the backwashing position, the valve core assembly is further defined to communicate the backwashing ejecting passage with the softening outlet passage;

a switching unit is defined to communicate the forward washing ejecting passage with the forward washing passage, when the valve core assembly is at the forward washing position; and, to communicate the backwashing ejecting passage with the backwashing passage, when the valve core assembly is at the backwashing position.

In one embodiment, the forward washing passage, the backwashing passage, the forward washing ejecting passage, and the backwashing ejecting passage are located at the same side of the valve cavity, and are defined as adjacent to each other.

In one embodiment, the forward washing passage includes a forward passage and a first by-pass passage, the first by-pass passage is connected with the forward washing ejecting passage; the backwashing passage includes a backward passage and a second by-pass passage, the second by-pass passage is connected with the backwashing ejecting passage;

the forward washing passage, the backwashing passage, the forward washing ejecting passage, and the backwashing ejecting passage are all located at one side of the valve cavity along a first direction, the forward passage, the backward passage, the forward washing ejecting passage, and the backwashing ejecting passage all extend along the first direction, the switching unit is defined to communicate the forward washing ejecting passage with the first by-pass passage, when the valve core assembly is at the forward washing position; and, to communicate the backwashing ejecting passage with the second by-pass passage, when the valve core assembly is at the backwashing position.

In one embodiment, the axes of the forward passage, the backward passage, the forward washing ejecting passage, and the backwashing ejecting passage are defined along a second direction and are arranged in interval with each other, the second direction is perpendicular to the first direction; the valve core assembly includes a valve core and a valve rod fixedly connected with the valve core and extended out of the valve body, the valve rod extends along the second direction, the valve core moves forth and back following the valve rod.

In one embodiment, at the second direction, the axes of the forward passage and the backward passage are located between the axes of the forward washing ejecting passage and the backwashing ejecting passage, and the axis of the forward passage is located between the axes of the backward passage and the forward washing ejecting passage.

In one embodiment, the valve cavity includes a peripheral surface, a first end surface, and a second end surface, the end surfaces are located at two ends of the peripheral surface of the valve cavity, the valve core rod extends out of the valve body via the first end surface;

the valve core is cylindrical, the peripheral surface of the valve core is provided with a first sealing surface, a first annular groove, a second sealing surface, a second annular groove and a third sealing surface, all of which are defined in sequence and along the direction close to the second end surface;

the valve core assembly further includes a groove defining assembly, the groove defining assembly is sleeved on the periphery of the valve core, the groove defining assembly includes a first water-passable grid, a second water-passable grid, a third water-passable grid and a fourth water-passable grid, the grids are annular and sequentially defined along the direction close to the second end surface, the first water-passable grid, the second water-passable grid, the third water-passable grid, and the fourth water-passable grid are sealed at and fixedly cooperate with the peripheral surface of the valve cavity adjacent to each other along the axis of the valve core;

the waste water passage communicates with the valve cavity at the first water-passable grid, the forward washing ejecting passage and the softening inlet passage communicate with the valve cavity respectively at the second water-passable grid, the water inlet passage and the forward washing passage communicate with the valve cavity respectively at the third water-passable grid; the backwashing passage communicates with the valve cavity at the fourth water-passable grid; the backwashing ejecting passage and the softening outlet passage all communicate with the valve cavity at the position close to the second end surface;

an inner cavity of the valve core communicates with the first water-passable grid and the softening outlet passage at the forward washing position, the first sealing surface seals the second water-passable grid, the first annular groove communicates with the third water-passable grid and the fourth water-passable grid, the second sealing surface seals and abut against the edge of the fourth water-passable grid that is close to the second end surface;

the first sealing surface seals the edge of the first water-passable grid that is close to the first end surface, the first annular groove communicates with the first water-passable grid and the second water-passable grid, the second sealing surface seals and abut against the edge of the second water-passable grid that is close to the second end surface; the second annular groove communicates with the third water-passable grid and the fourth water-passable grid, the third sealing surface seals and abut against the edge of the fourth water-passable grid that is close to the second end surface.

The water outlet passage of the valve body communicates with the valve cavity at the fourth water-passable grid; the valve core assembly also includes a fastening ring and a connecting pin, one end of the valve core rod that extending into the inner cavity of the valve core is provided with a small hole fitting the connecting pin, one end of the valve core facing the first end surface is provided with a mounting hole; a step surface is formed between the mounting hole and the inner cavity of the valve core, the fastening ring sleeves on the periphery of the valve core rod and cooperates with the thread of the mounting hole; The connecting pin exposes at two ends of the valve core rod and is located between the fastening ring and the step surface.

In one embodiment, the groove defining assembly includes a first sealing ring, a first grid, a second sealing ring, a second grid, a third sealing ring, a third grid, a fourth sealing ring, a fourth grid, and a fifth sealing ring, being sequentially defined in the direction close to the second end surface;

the first sealing ring, the first grid, and the second sealing ring cooperatively form the first water-passable grid, the second sealing ring, the second grid, and the third sealing ring cooperatively form the second water-passable grid, the third sealing ring, the third grid, and the fourth sealing ring cooperatively form the third water-passable grid, the fourth sealing ring, the fourth grid, and the fifth sealing ring cooperatively form the fourth water-passable grid.

The groove defining assembly also includes an annular irregular grid, the irregular grid is sandwiched between the fifth sealing ring and the second end face, and the irregular grid is provided with a water-passable slot corresponding to the backwashing ejecting passage and softening outlet passage.

In one embodiment, the axis of the forward passage and the axis of the forward washing ejecting passage are defined to be offset from each other along a third direction, the third direction is perpendicular to the first direction and the second direction, the axis of the backward passage and the axis of the backwashing ejecting passage are defined to be offset from each other;

the forward passage is defined close to the forward washing ejecting passage, the backward passage is defined close to the backwashing ejecting passage, the forward passage is defined close to the backward passage, In one embodiment, the axis of the forward passage and the axis of the backward passage are located at a first plane, the first plane is perpendicular to the third direction, the axis of the forward washing ejecting passage and the axis of the backwashing ejecting passage are located at a second plane, the second plane is perpendicular to the third direction.

In one embodiment, the valve body includes a main body and a first end cap, the valve cavity is formed in the main body; the forward passage, the backward passage, the forward washing ejecting passage, and the backwashing ejecting passage include respectively an inner section and an exterior section, the inner section is formed in the main body and is communicated with the valve cavity, the exterior section is formed in the first end cap;

the first end cap detachedly covers the main body, making each of the exterior sections correspondingly connected with each of the inner sections; the first by-pass passage and the second by-pass passage are both formed in the first end cap, the first by-pass passage communicates with the exterior sections of the forward passage and the forward washing ejecting passage, the second by-pass passage communicates with the exterior sections of the backward passage and the backwashing ejecting passage.

In one embodiment, the first bypass passage forms a first plug port in the outer side of the first end cap and the second bypass passage forms a second plug port in the outer side of the first end cap;

The switching unit includes a long plug head and a short plug head, when the valve core assembly is at the forward washing position, the long plug head is defined to seal the second plug port and block the exterior section of the backward passage and/or the backwashing ejecting passage, and the short plug head is defined to seal the first plug port; and, when the valve core assembly is at the backwashing position, the long plug head is defined to seal the first plug port and block the exterior section of the forward passage and/or the forward washing ejecting passage, and the short plug head is defined to seal the second plug port.

In one embodiment, the exterior sections of the forward washing ejecting passage and the backwashing ejecting passage are both close to the exterior edge of the first end cap, the first by-pass passage and the second by-pass passage both extend along the direction perpendicular to the first direction.

In one embodiment, when the valve core assembly is at the forward washing position, the long plug head cooperates with the second by-pass passage via threads, the short plug head cooperates with the first by-pass passage via threads; when the valve core assembly is at the backwashing position, the long plug head cooperates with the first by-pass passage via threads, the short plug head cooperates with the first by-pass passage via threads.

The present disclosure also provides a water softener, the water softener includes an ion exchange pot, a saline solution tank and a water softener valve. The water softener valve includes a valve body, a valve core assembly and a switching unit.

The valve body includes a valve cavity, and a water inlet passage, a forward washing passage, a backwashing passage, and an ejecting passage all communicating with the valve cavity, a saline solution suction passage communicating with an ejection outlet of the ejecting passage, and a softening inlet passage, a softening outlet passage, and a waste water passage all communicating with the valve cavity; the forward washing passage and the backwashing passage both connecting with the ejecting passage;

a valve core assembly, provided with a forward washing position and a backwashing position cooperated with the valve cavity, at the forward washing position, the valve core assembly being defined to communicate the water inlet passage with the forward washing passage, the ejecting passage with the softening inlet passage, and the softening outlet passage with the waste water passage; at the backwashing position, the valve core assembly being defined to communicate the water inlet passage with the backwashing passage, the ejecting passage with the softening outlet passage, and the softening inlet passage with the waste water passage; and a switching unit, defined to communicate the forward washing passage with the ejecting passage when the valve core assembly is at the forward washing position; and, to communicate the backwashing passage with the ejecting passage when the valve core assembly is at the backwashing position.

the ion exchange pot includes a pot body and a central tube disposed in the pot body, an ion exchange cavity being defined between the central tube and the inner wall of the pot body, the softening inlet passage is communicated with the ion exchange cavity, the softening outlet passage is communicated with the central tube, the saline solution suction passage is communicated with the saline solution tank.

In one embodiment, the ejecting passage includes a forward washing ejecting passage and a backwashing ejecting passage which are both communicated with the valve cavity; the forward washing ejecting passage is connected with the forward washing passage, the backwashing ejecting passage is connected with the backwashing passage, each outlet of the forward washing ejecting passage and the backwashing ejecting passage is communicated with the saline solution suction passage;

at the forward washing position, the valve core assembly is further defined to communicate the forward washing ejecting passage with the softening inlet passage; and at the backwashing position, the valve core assembly is further defined to communicate the backwashing ejecting passage with the softening outlet passage;

the switching unit is defined to communicate the forward washing ejecting passage with the forward washing passage when the valve core assembly is at the forward washing position; and, to communicate the backwashing ejecting passage with the backwashing passage when the valve core assembly is at the backwashing position.

In one embodiment, the forward washing passage, the backwashing passage, the forward washing ejecting passage, and the backwashing ejecting passage are located at the same side of the valve cavity, and are defined as adjacent to each other.

In one embodiment, the forward washing passage includes a forward passage and a first by-pass passage, the first by-pass passage is connected with the forward washing ejecting passage; the backwashing passage includes a backward passage and a second by-pass passage, the second by-pass passage is connected with the backwashing ejecting passage;

the forward washing passage, the backwashing passage, the forward washing ejecting passage, and the backwashing ejecting passage are located at one side of the valve cavity along a first direction, the forward passage, the backward passage, the forward washing ejecting passage, and the backwashing ejecting passage all extend along the first direction, the switching unit is defined to communicate the forward washing ejecting passage with the first by-pass passage, when the valve core assembly is at the forward washing position; and, to communicate the backwashing ejecting passage with the second by-pass passage, when the valve core assembly is at the backwashing position.

In one embodiment, the valve body includes a main body and a first end cap, the valve cavity is formed in the main body; the forward passage, the backward passage, the forward washing ejecting passage, and the backwashing ejecting passage include respectively an inner section and an exterior section, the inner section is formed in the main body and is communicated with the valve cavity, the exterior section is formed in the first end cap;

the first end cap detachedly covers the main body, making each of the exterior sections correspondingly connected with each of the inner sections; the first by-pass passage and the second by-pass passage are formed in the first end cap respectively, the first by-pass passage communicates with the exterior sections of the forward passage and the forward washing ejecting passage, the second by-pass passage communicates with the exterior sections of the backward passage and the backwashing ejecting passage.

In one embodiment, the first by-pass passage forms a first plug port in the exterior side of the first end cap, the second by-pass passage forms a second plug port in the exterior side of the first end cap;

The switching unit includes a long plug head and a short plug head, when the valve core assembly is at the forward washing position, the long plug head is defined to seal the second plug port and block the exterior section of the backward passage and/or the backwashing ejecting passage, and the short plug head is defined to seal the first plug port; and, when the valve core assembly is at the backwashing position, the long plug head is defined to seal the first plug port and block the exterior section of the forward passage and/or the forward washing ejecting passage, and the short plug head is defined to seal the second plug port.

The water softener valve of the present disclosure is provided with a forward washing passage and a backwashing passage in the valve body at the same time, communicating with the valve cavity, and, a forward washing station and a backwashing station are correspondingly defined for the valve core assembly. That is to say, the valve cavity communicates with different passages according to the movement of the valve core, meanwhile, a switching unit is defined to cooperate with the valve core assembly, so as to form forward washing passage and backwashing passage correspondingly. Generally, the switching operation is simple, and the user can freely select the mode of forward washing or backwashing saline solution suction and regeneration according to specific conditions, maximizing the efficiency of the water softener.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only about some embodiments of the present disclosure, and persons of ordinary skill in the art can derive other drawings from the accompanying drawings without creative efforts.

BRIEF DESCRIPTION OF THE DRAWING GRADES

Figure 1:
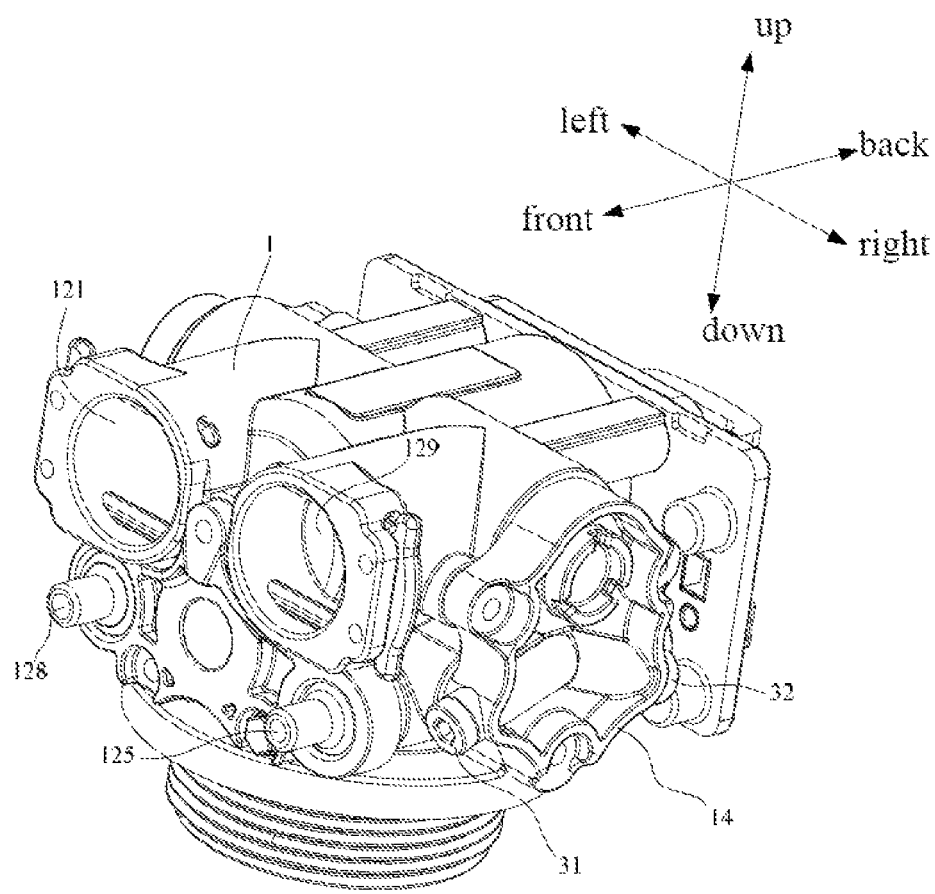
FIG. 1 is a schematic structural diagram of an embodiment of a water softener valve of the present disclosure.
Figure 2:
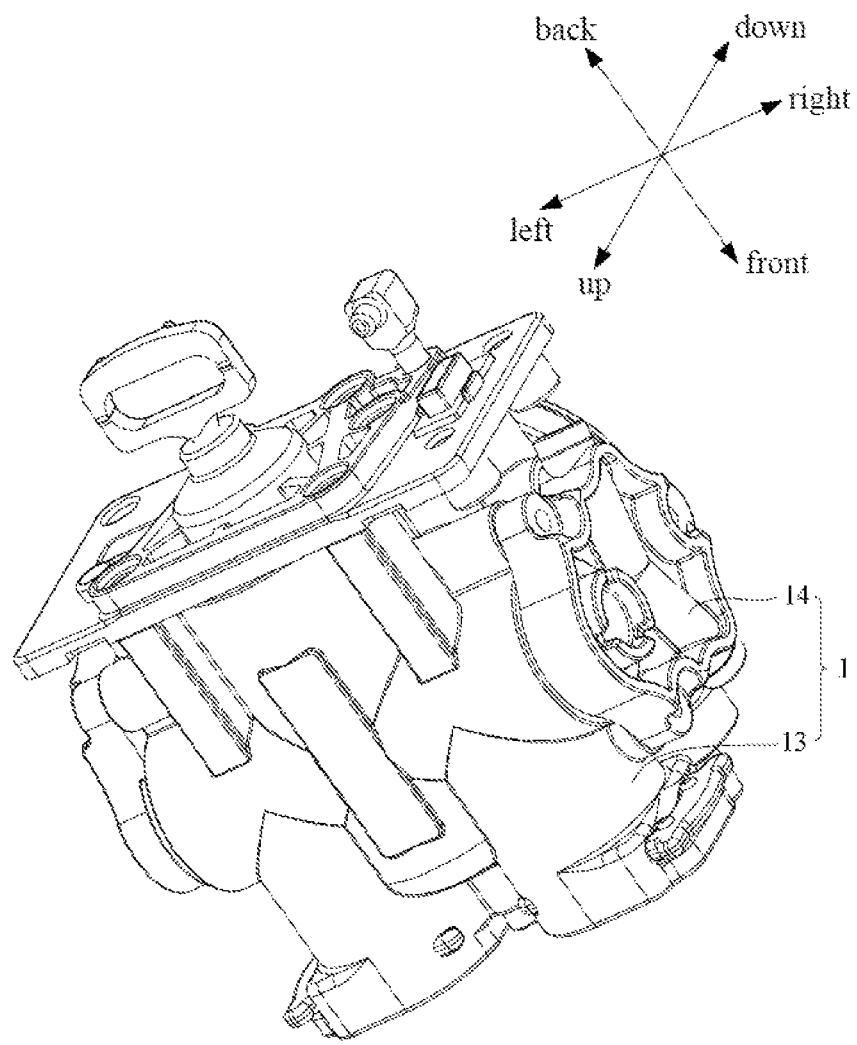
FIG. 2 is a schematic structural view of another angle of the water softener valve in FIG. 1.

| Grade | Name |
|---|---|
| 1 | valve body |
| 11 | valve cavity |
| 111 | first end surface |
| 112 | second end surface |
| 121 | water inlet passage |
| 122 | washing passage |
| 122a | forward passage |
| 122b | first by-pass passage |
| 123 | backwashing passage |
| 123a | backward passage |
| 123b | second by-pass passage |
| 124a | forward washing ejecting passage |
| 124b | backwashing ejecting passage |
| 125 | saline solution suction passage |
| 126 | softening inlet passage |
| 127 | softening outlet passage |
| 128 | waste water passage |
| 129 | water out passage |
| 13 | main body |
| 14 | first end cap |
| 141 | first plug |
| 142 | second plug |
| 21 | valve core |
| 211 | first sealing surface |
| 212 | first annular groove |
| 213 | second sealing surface |
| 214 | second annular groove |
| 215 | third sealing surface |
| 22 | valve rod |
| 23 | grove fixing assembly |
| 23a | first water-passable grid |
| 23b | second water-passable grid |
| 23c | third water-passable grid |
| 23d | fourth water-passable grid |

-continued

| Grade | Name |
|---|---|
| 230 | first sealing surface |
| 231 | first grid |
| 232 | second sealing surface |
| 233 | second grid |
| 234 | third sealing ring |
| 235 | third grid |
| 236 | fourth sealing ring |
| 237 | fourth grid |
| 238 | fifth sealing ring |
| 239 | irregular grid |
| 24 | fastening ring |
| 25 | connecting pin |
| 3 | switching unit |
| 31 | long plug head |
| 32 | short plug head |
| 4 | ejector |
| 100 | ion exchange pot |
| 101 | pot body |
| 102 | central tube |
| 103 | ion exchange cavity |
| 200 | saline solution tank |
| 300 | water softener valve |

The implementation of the object of the present disclosure, and its functional features and advantages will be further illustrated in combination with embodiments with reference to the accompanying drawings.

DETAILED DESCRIPTION OF THE EMBODIMENTS

The technical solutions of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

It should be noted that, all of the directional instructions in the exemplary embodiments of the present disclosure (such as top, down, left, right, front, back) can only be used for explaining relative position relations, moving condition of the elements under a special form (referring to figures), and so on, if the special form changes, the directional instructions changes accordingly.

The present disclosure proposes a water softener valve 300.

In the embodiment of the present disclosure, as shown in FIGS. 1 to 7, the water softener valve 300 includes:

the valve body 1, Including the valve cavity 11, the water inlet passage 121 that is communicated with the valve cavity 11, the forward washing passage 122, the backwashing passage 123, the ejecting passage (124a, 124b), the saline solution suction passage 125 that is communicated with the outlet of the ejecting passage (124a, 124b, and the softening inlet passage 126, the softening outlet passage 127, and the waste passage 128, communicating with the valve cavity 11; the forward washing passage 122 and the backwashing passage 123 are communicated with the ejecting passage (124a, 124b) respectively;

a valve core assembly is provided with a forward washing position and a backwashing position, cooperating with the valve cavity 11, at the forward washing position, the valve core assembly is defined to communicate the water inlet passage 121 with the forward washing passage 122, the ejecting passage (124a, 124b) with the softening inlet passage 126, and the softening outlet passage 127 with the waste water passage 128; at the backwashing position, the valve core assembly is defined to communicate the water inlet passage 121 with the backwashing passage 123, the ejecting passage (124a, 124b) with the softening outlet passage 127, and the softening inlet passage 126 with the waste water passage 128; and the switching unit 3, the switching unit is defined to communicate the forward washing passage 122 with the ejecting passage (124a, 124b), when the valve core assembly is at the forward washing position; and, communicating the backwashing passage 123 with the ejecting passage (124a, 124b), when the valve core assembly is at the backwashing position.

In this embodiment, the valve body 1 may be constructed in the way that a number of components are fastened via bolts and structure such as sealing ring is used for sealing cooperation on the cooperating surface, all the components are formed integrally via injection molding to adapt to large scale production. Additionally, the valve body 1 may be constructed in the way that a number of components are connected via ultrasonic welding, forming the relative elaborate valve cavity 11 and each passage; and, the valve body 1 may also be produced by the emerging 3D printing technology to adapt to small scale production.

Figure 4:
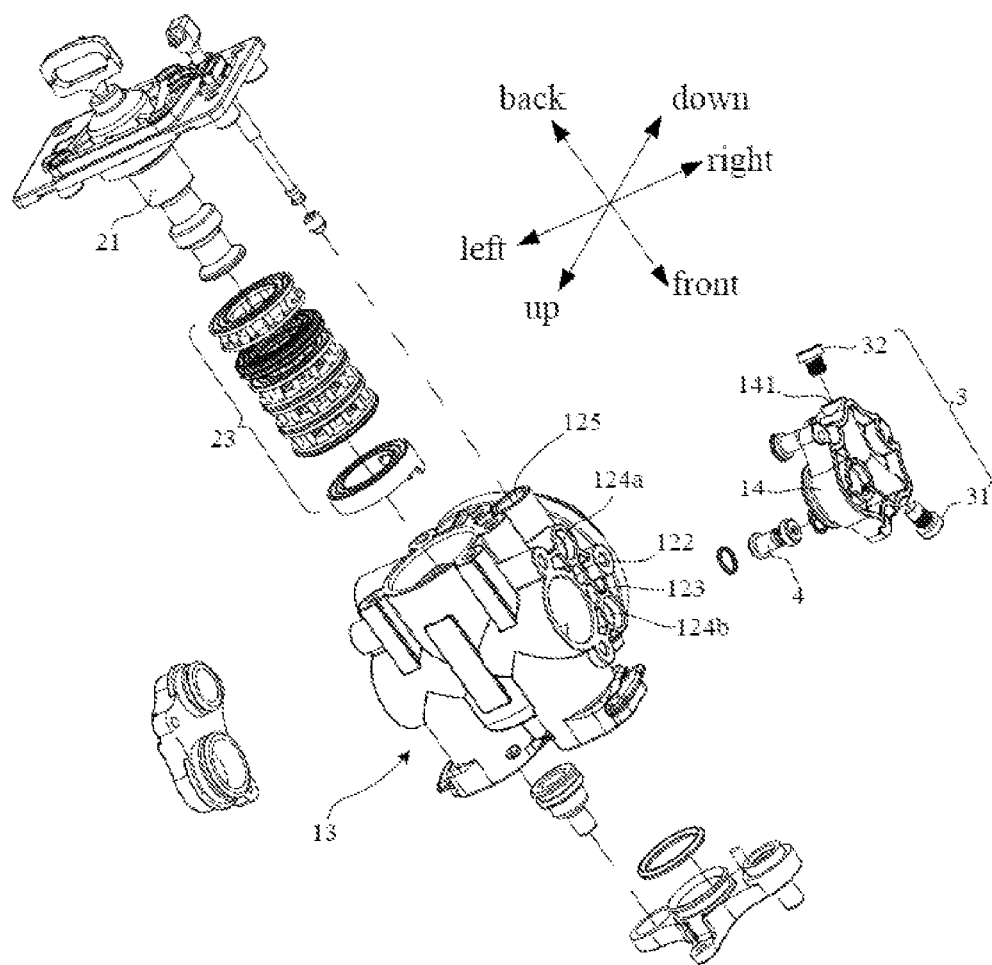
FIG. 4 is a partially exploded view of another angle of the water softener valve in FIG. 1.
Figure 5:
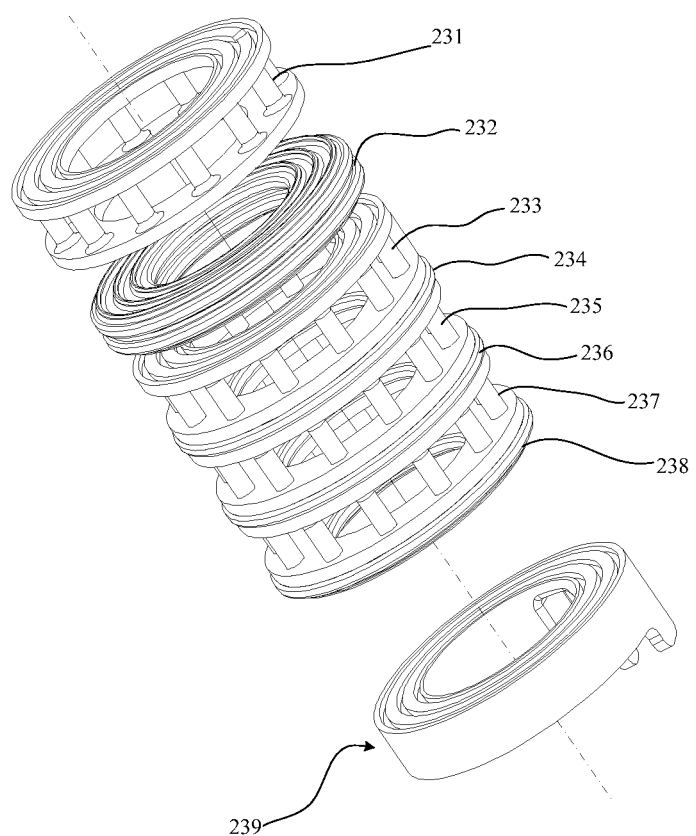
FIG. 5 is an enlarged structural schematic view of the slot fixing assembly of FIG. 4.
Figure 8:
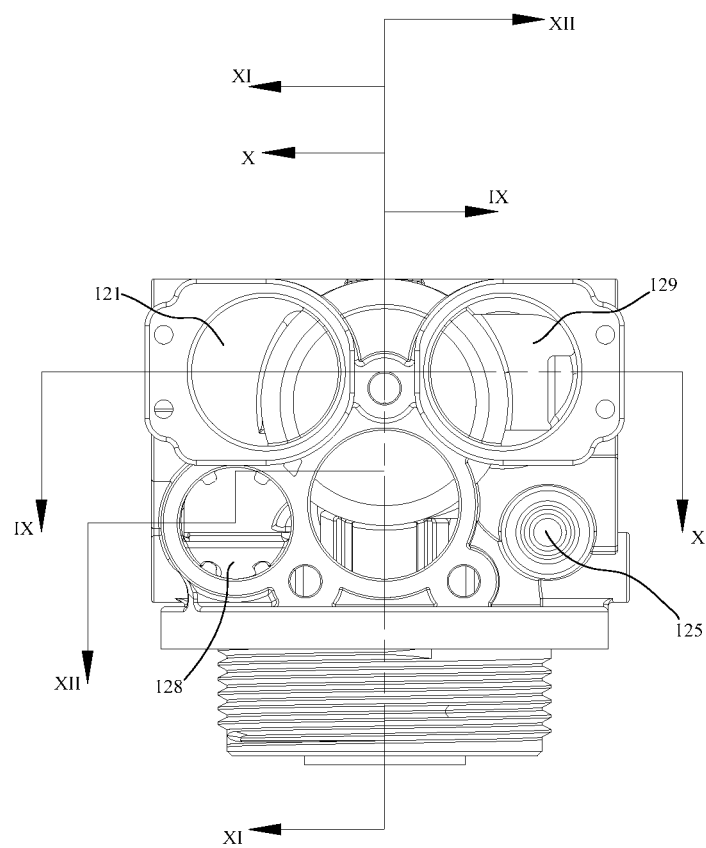
FIG. 8 is a schematic front view of the valve body of FIG. 6.

Referring to FIGS. 1, 4 and 8, the water inlet passage 121, the water outlet passage 129, and the waste water passage 128 form a interface at the front end of the valve body 1 respectively.

Figure 9:
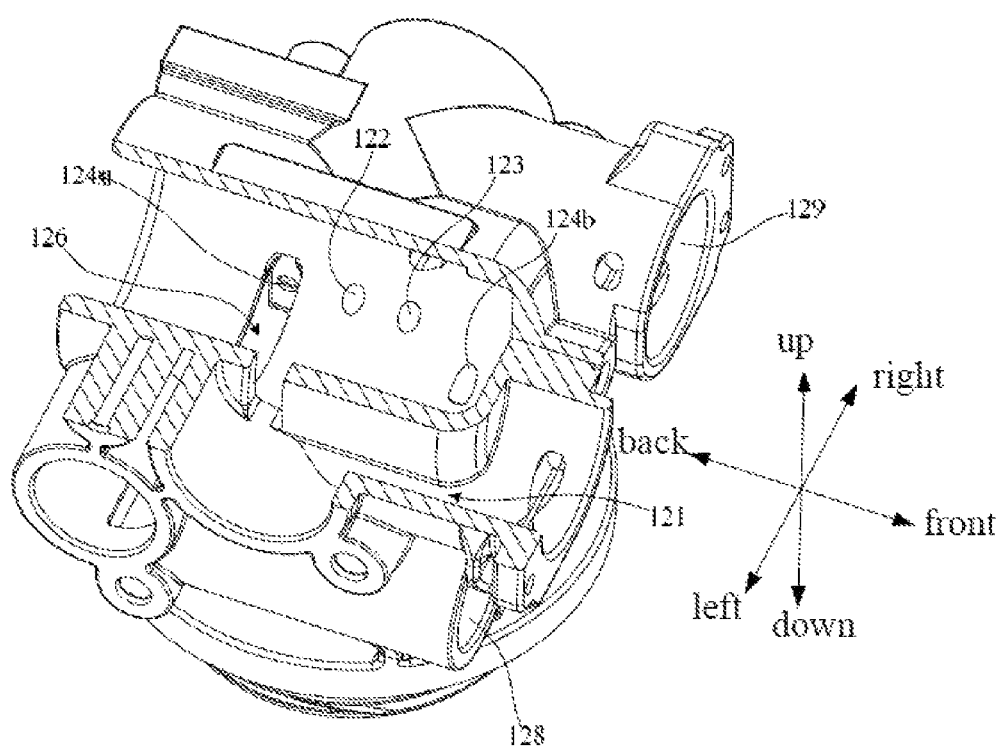
FIG. 9 is a schematic cross-sectional view taken along line IX-IX in FIG. 8.

Please refer to FIG. 9, as an example, the water inlet passage 121 extends along the left side of the valve cavity 11 and communicates with the left side wall of the valve cavity 11. A strip hole is shown in the figure. For the formation of the strip hole, the left side of valve body 1 is provided with corresponding auxiliary hole, so as to accommodate the drawing process in injection molding.

Figure 10:
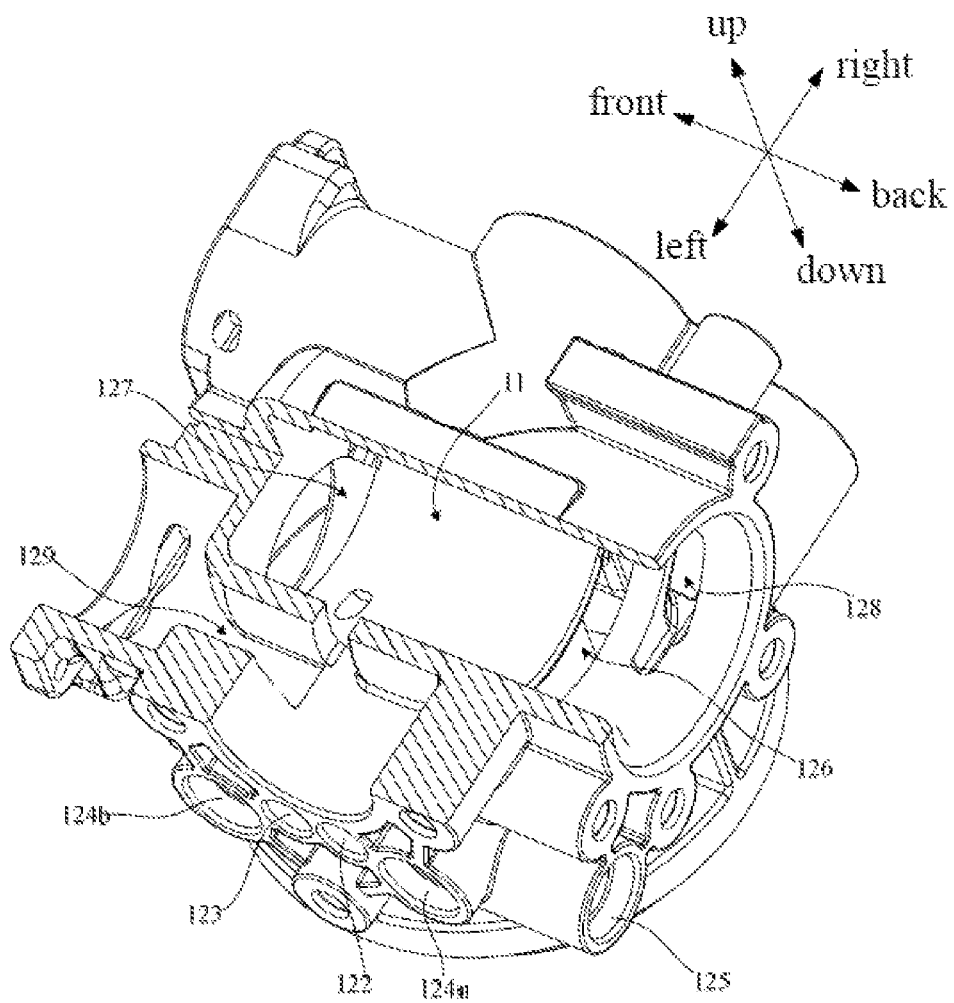
FIG. 10 is a schematic cross-sectional view taken along line X-X in FIG. 8.

Referring to FIG. 10, as an example, water outlet passage 129 of the softener valve 300 extends along the right side of the valve cavity 11, and communicates with the right side wall of the cavity 11. A strip hole is shown in the figure. For the formation of the strip hole, similarly, the right side of valve body 1 is provided with corresponding auxiliary hole, so as to accommodate the drawing process in injection molding. In the softening process, the water to be treated firstly flows into the water inlet passage 121, and is guided through the valve cavity 11 into the softening inlet passage 126, i.e. the softening input passage, the softening inlet passage 126 leads the water into a chamber containing the ion exchange filter material, the chamber contains the softening resin for instance, the water is softened herein, and the softened water flows into the softening outlet passage 127 and then the valve chamber 11 through the central pipe 102, the softening outlet passage 127 is a softening output passage, and finally flows out of the water outlet passage 129 for use or storage by users.

Figure 11:
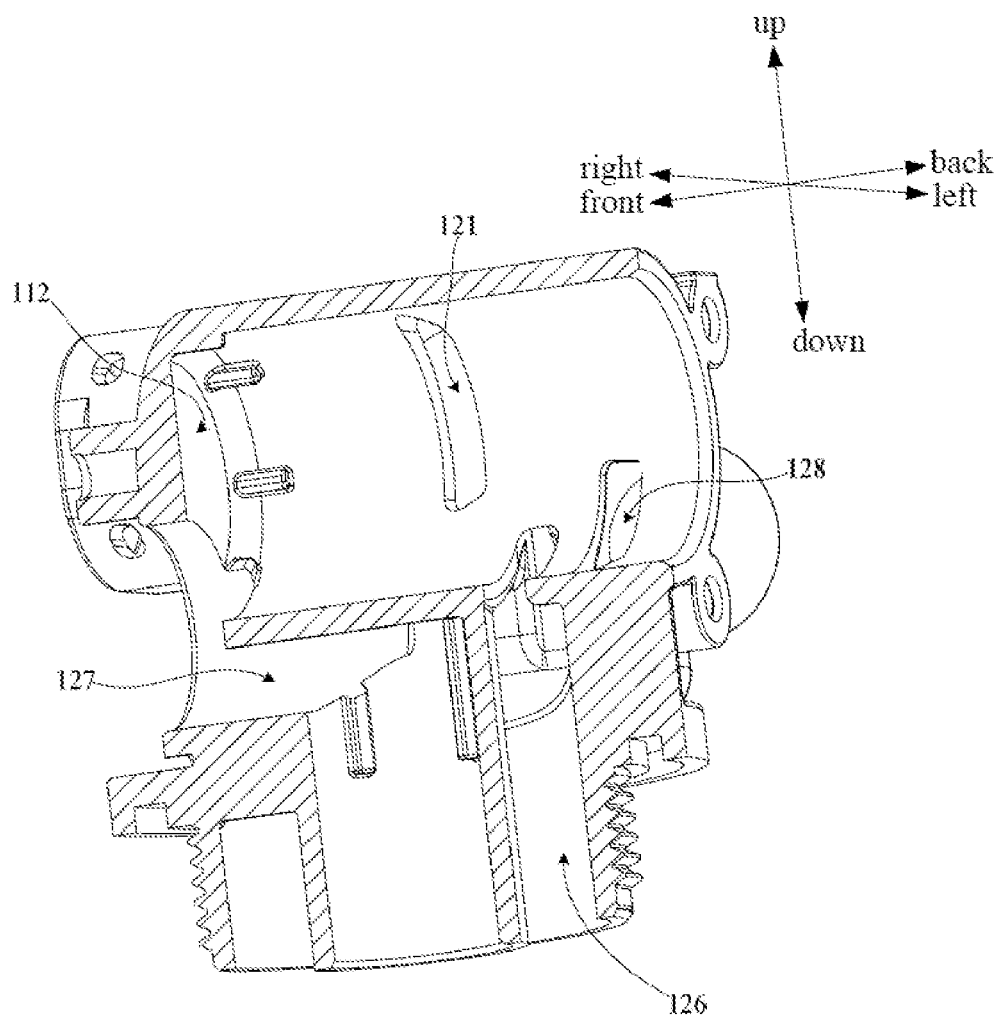
FIG. 11 is a schematic cross-sectional view taken along line XI-XI in FIG. 8.
Figure 12:
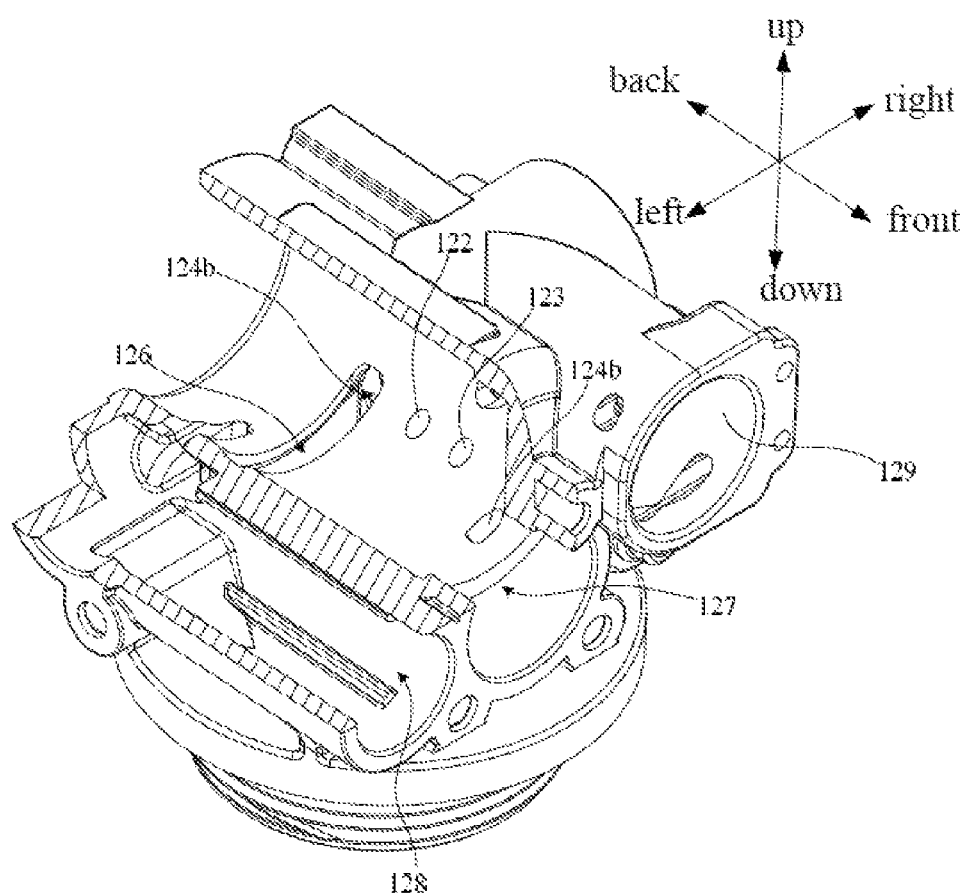
FIG. 12 is a schematic cross-sectional view taken along line XII-XII in FIG. 8.

Referring to FIG. 11, as an example, the softening outlet passage 127 has a vertical section that is extensible upward and downward, and a horizontal section that is extensible forward and backward, the softening outlet passage 127 forms a strip hole in the front end and in the bottom wall surface of the valve cavity 11. For the formation of the strip hole, similarly, the front end of valve body 1 is provided with corresponding auxiliary hole, so as to accommodate the drawing process in injection molding. the softening outlet passage 127 forms a strip hole in the rear end and in the bottom wall surface of the valve body 1, so as to communicate with the cavity 11. Referring to FIG. 12, as an example, the waste water passage 128 firstly extends along the left side of the valve cavity 11, and then a strip hole is formed in the rear end and the left side wall of the valve cavity 11. Similarly, the left end of valve body 1 is provided with corresponding auxiliary hole, so as to accommodate the drawing process in injection molding.

Figure 20:
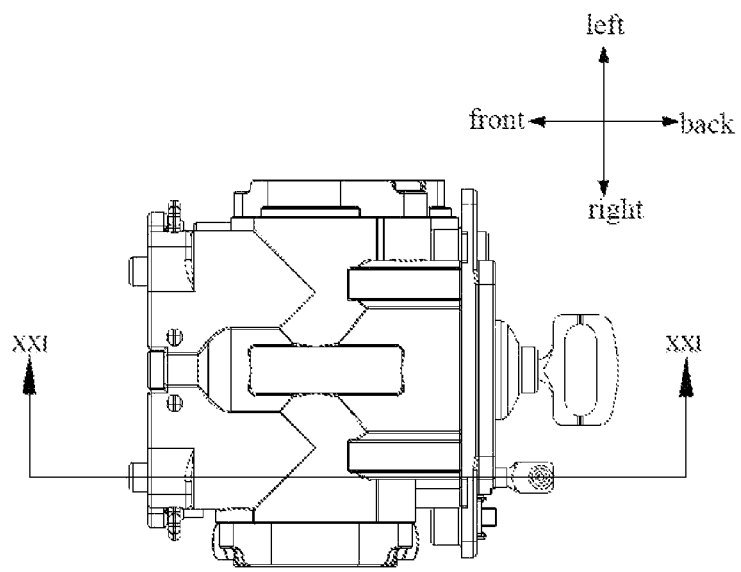
FIG. 20 is a schematic top view of the water softener valve of FIG. 1, the water softener valve is in a forward washing condition.
Figure 21:
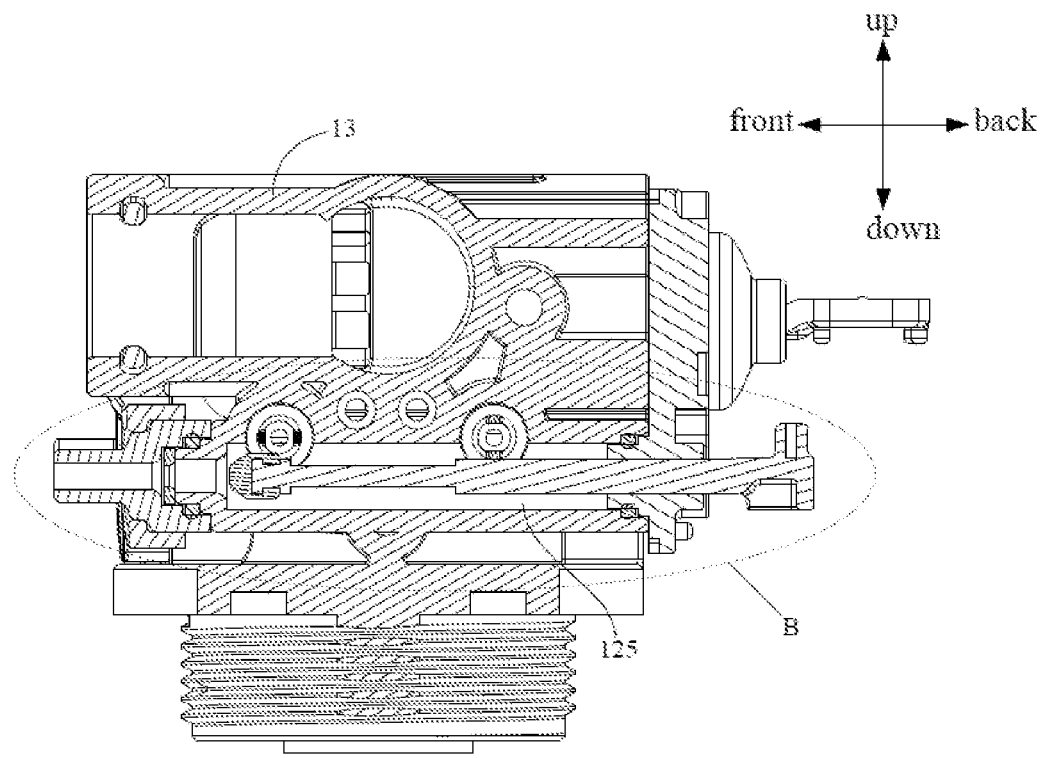
FIG. 21 is a schematic cross-sectional view of FIG. 20 taken along line) XXI-XXI.
Figure 22:
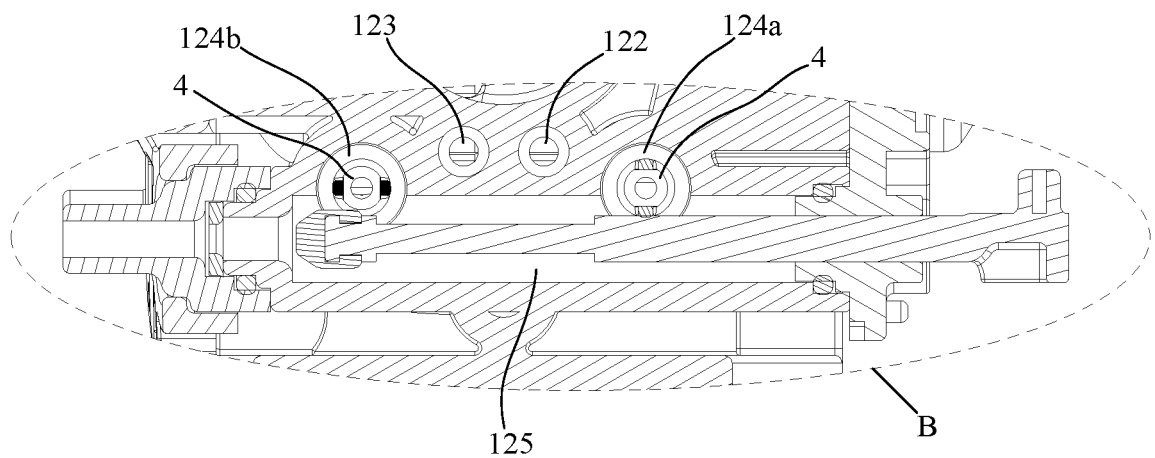
FIG. 22 is an enlarged partial view at B in FIG. 21.
Figure 23:
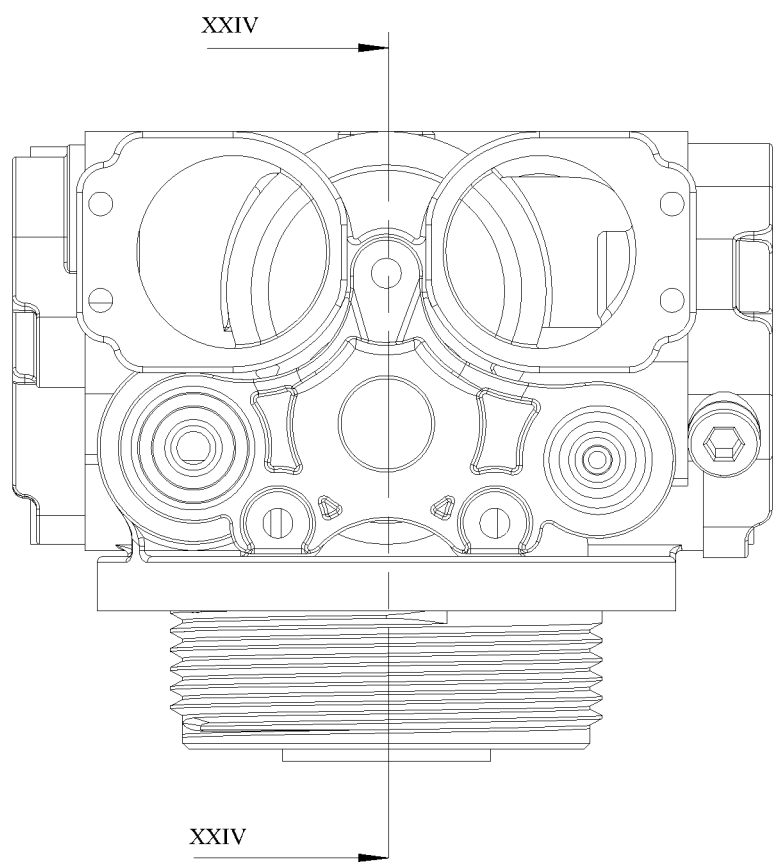
FIG. 23 is a schematic front view of the water softener valve of FIG. 1, the water softener valve is in a forward washing condition.
Figure 24:
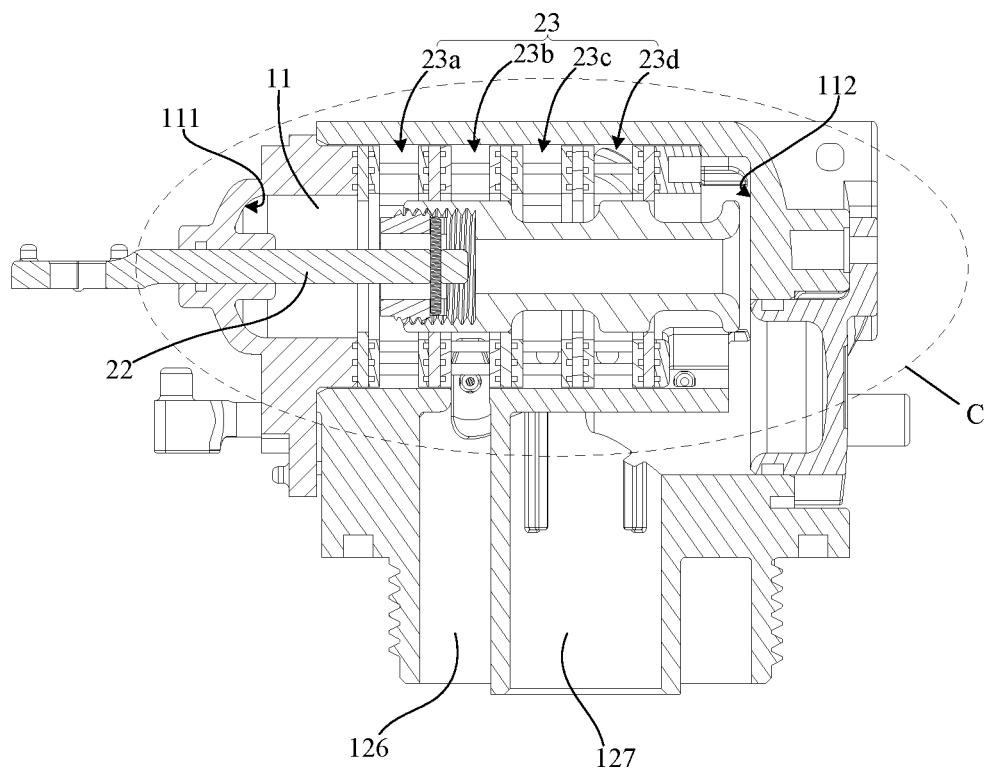
FIG. 24 is a schematic cross-sectional view taken along line IX-IX XXIV-XXIV in FIG. 23.

Referring to FIGS. 20 to 22, the saline solution suction passage 125 on the right side of the valve cavity 11 extends forward and backward, and the saline solution suction passage 125 communicates with both the forward washing passage 122 and the backwashing passage 123. The saline solution suction passage 125 may be used for both saline solution suction and water injection to the saline solution tank 200. In addition, a plug assembly for water injection may be provided in the saline solution suction passage 125 for blocking its inlet, while the forward washing passage 122 is kept in communication with the backwashing passage 123.

Figure 3:
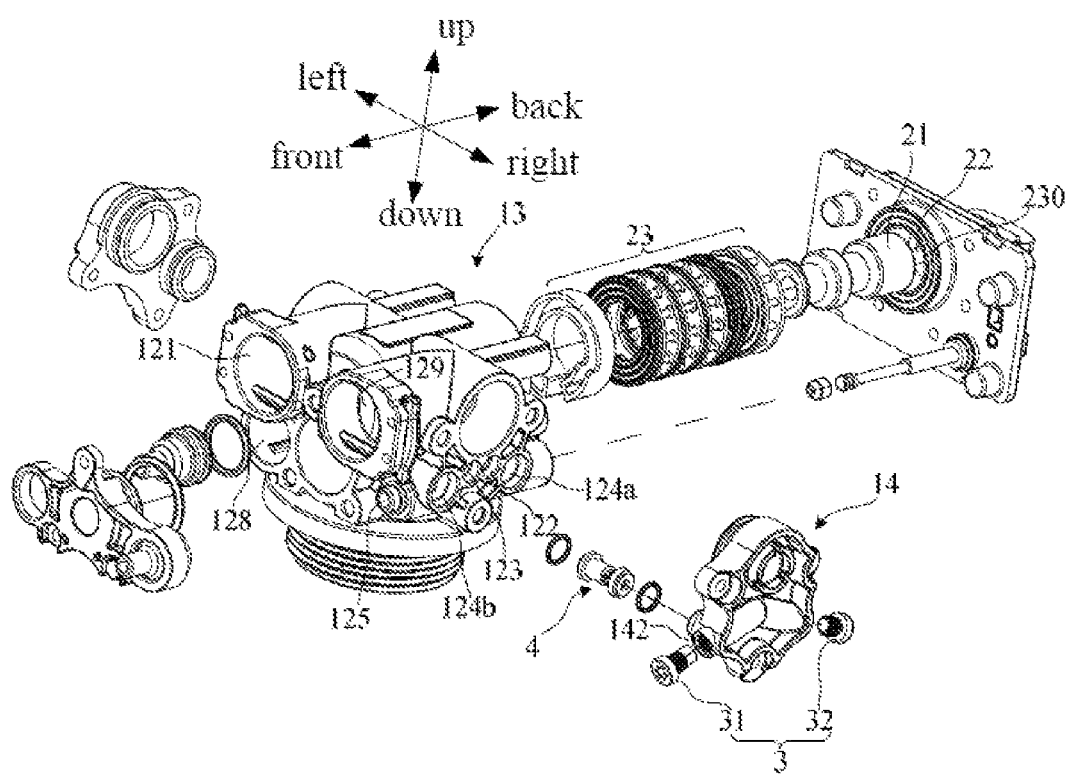
FIG. 3 is a partially exploded schematic view of the water softener valve of FIG. 1.
Figure 6:
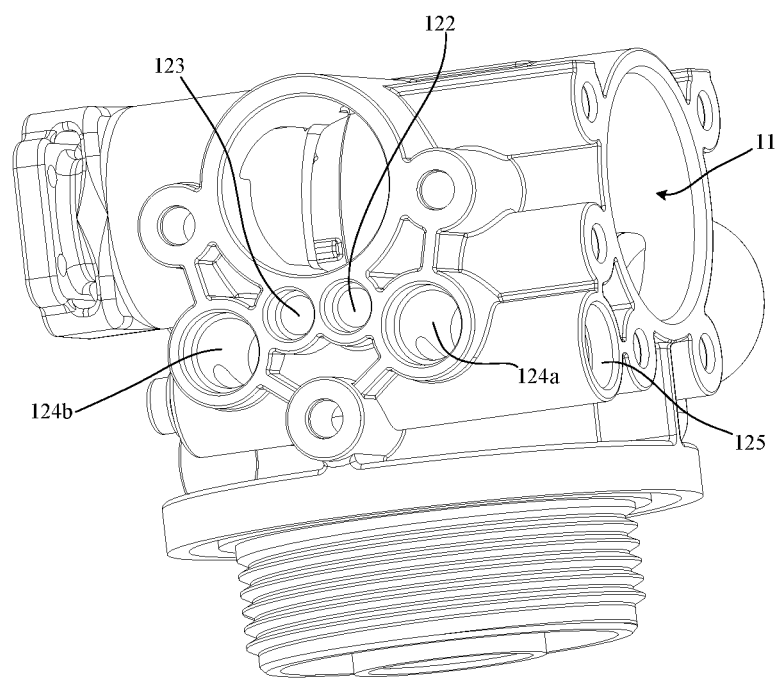
FIG. 6 is a schematic structural view of the valve body of FIG. 1.
Figure 7:
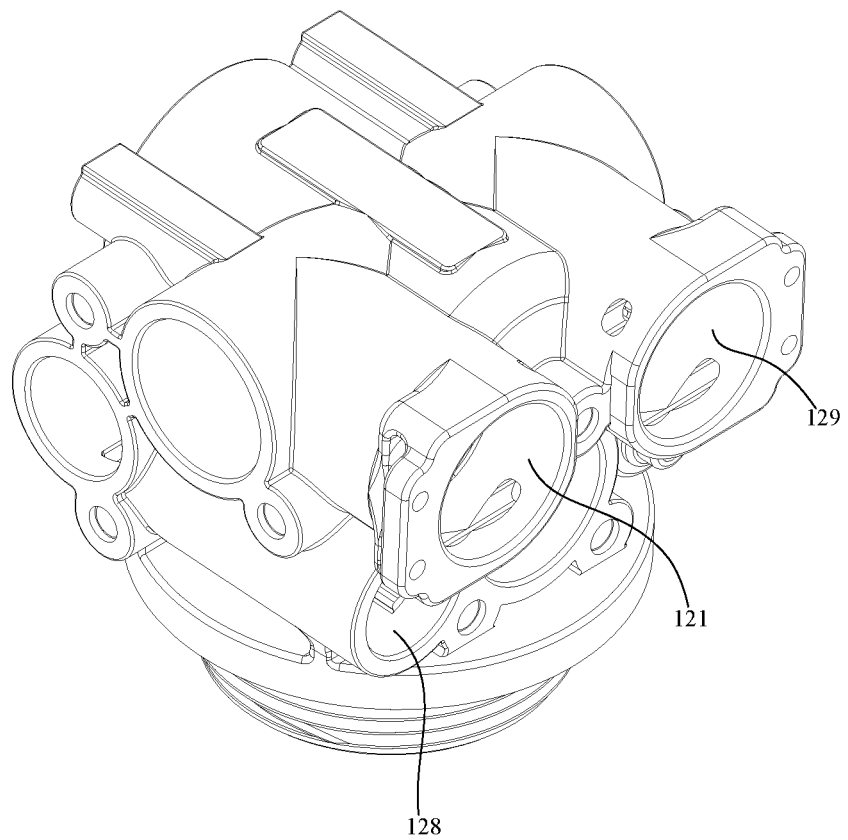
FIG. 7 is a schematic structural view of another angle of the valve body in FIG. 6.

Referring to FIGS. 3, 4 and 6, forward washing passage 122, the backwashing passage 123, and the ejecting passage (124a, 124b) of the valve body 1 form an interface at the right end of the valve body 1.

Figure 13:
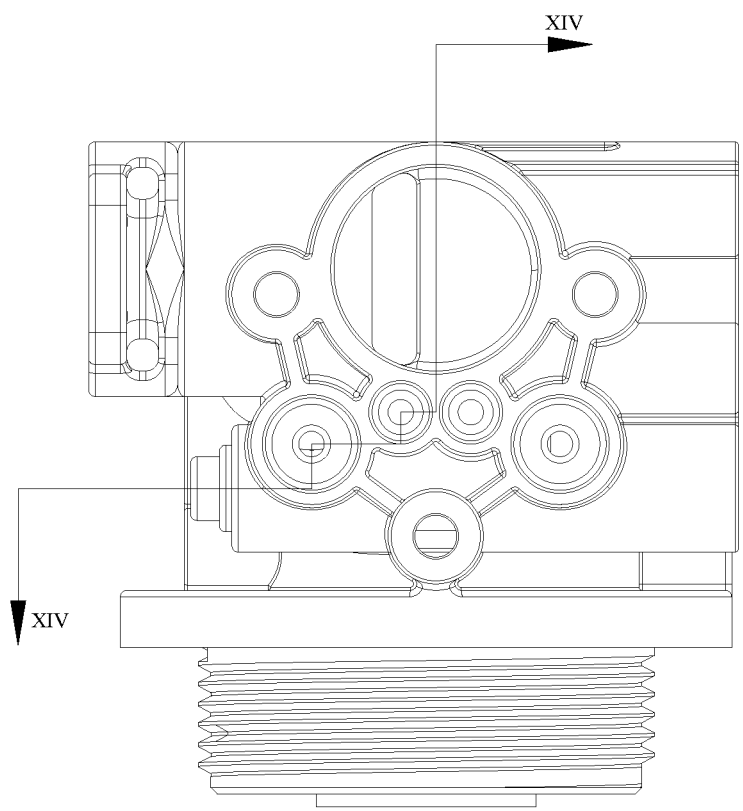
FIG. 13 is a right schematic view of the valve body of FIG. 6.
Figure 14:
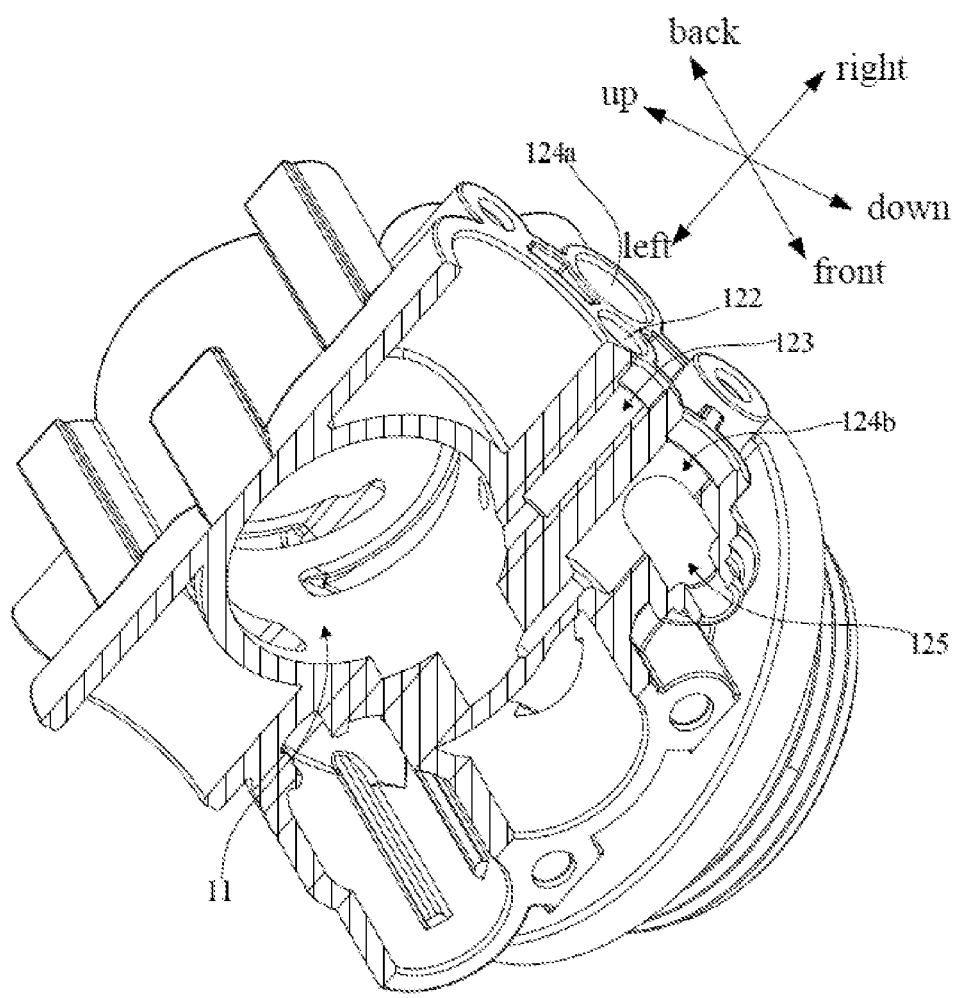
FIG. 14 is a schematic cross-sectional view taken along line XIV-XIV in FIG. 13.

Referring to FIGS. 13 and 14, the backward passage 123 and the one branch of the ejecting passage (124a, 124b)— backwashing ejecting passage 124b, respectively form two through holes on the right side wall of the valve cavity 11, and it can be seen from the figures that the backwashing ejecting passage 124b communicates with the saline solution suction passage 125.

Figure 15:
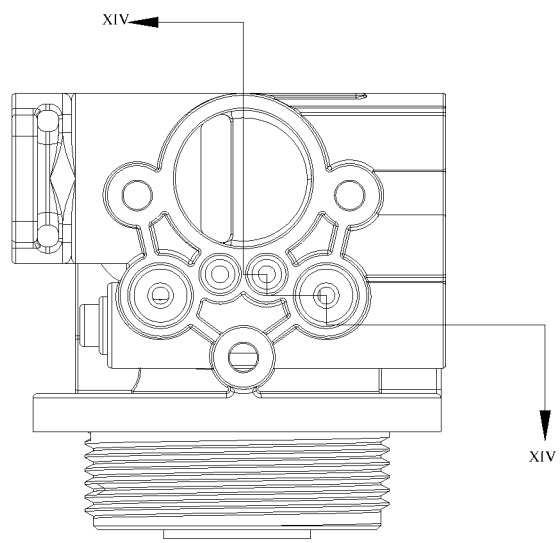
FIG. 15 is a right schematic view of the valve body of FIG. 6.
Figure 16:
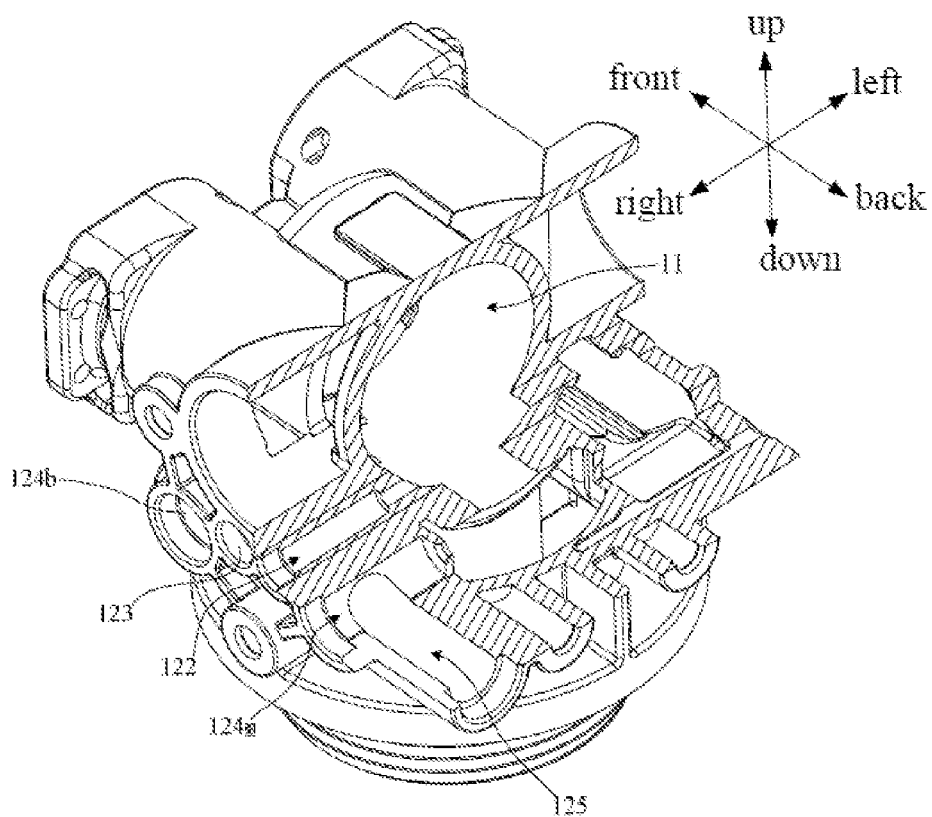
FIG. 16 is a schematic cross-sectional view taken along line IX-IX XVI-XVI in FIG. 15

Referring to FIGS. 15 and 16, the forward passage 123 and the other branch of the ejecting passage (124a,124b)— forward washing ejecting passage 124a, respectively form two through holes on the right side wall of the valve cavity 11, it can be seen from the figures that the forward washing ejecting passage 124a communicates with the saline solution suction passage 125. The ejector 4 of the water softener valve 300 is defined at the outlets of the forward washing ejecting passage 124a and the backwashing ejecting passage 124b respectively. Although the ejecting passage (124a, 124b) of the present embodiment includes two branches, it will be understood that the forward washing passage 122 and the backwashing passage 123 may share one ejecting passage (124a,124b), or the ejecting passage (124a,124b) may include more branches as long as the ejecting passage (124a,124b) can be defined properly to cooperate with the valve core assembly.

The valve core assembly includes at least one movable component, the movable component may be switched between a forward washing position and a backwashing position in a rotating or translating manner to accommodate communication of different passages. No specific example is provided here. It may be understood that the movement of the movable component of the valve core assembly can be implemented either manually or automatically.

The switching unit 3 is defined to cooperate with the valve core assembly to form the corresponding forward washing passage and backwashing passage, the switching unit 3 is cooperated with the valve core assembly, both may move at the same time, and one may move forward, the other one may move backward, or the valve core assembly may be adjusted firstly and the switching unit 3 in turn, the movement of both is not required on the aspect of time. Similarly, the switching unit 3 can be implemented either manually or automatically.

The water softener valve 300 of the present disclosure is provided with a forward washing passage 122 and a backwashing passage 123 in the valve body 1 at the same time, communicating with the valve cavity 11, and, a forward washing station and a backwashing station are correspondingly defined for the valve core assembly. That is to say, the valve cavity 11 communicates with different passages according to the movement of the valve core 21, meanwhile, a switching unit is defined to cooperate with the valve core assembly, so as to form forward washing passage and backwashing passage correspondingly. Generally, the switching operation is simple, and the user can freely select the mode of forward washing or backwashing saline solution suction and regeneration according to specific conditions, maximizing the efficiency of the water softener.

Figure 17:
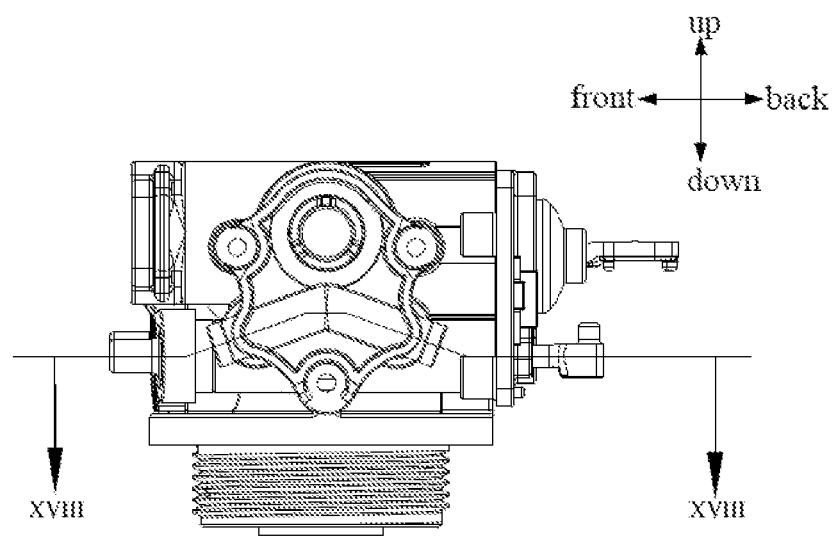
FIG. 17 is a right schematic view of the water softener valve of FIG. 1, the water softener valve is in a forward washing condition.
Figure 18:
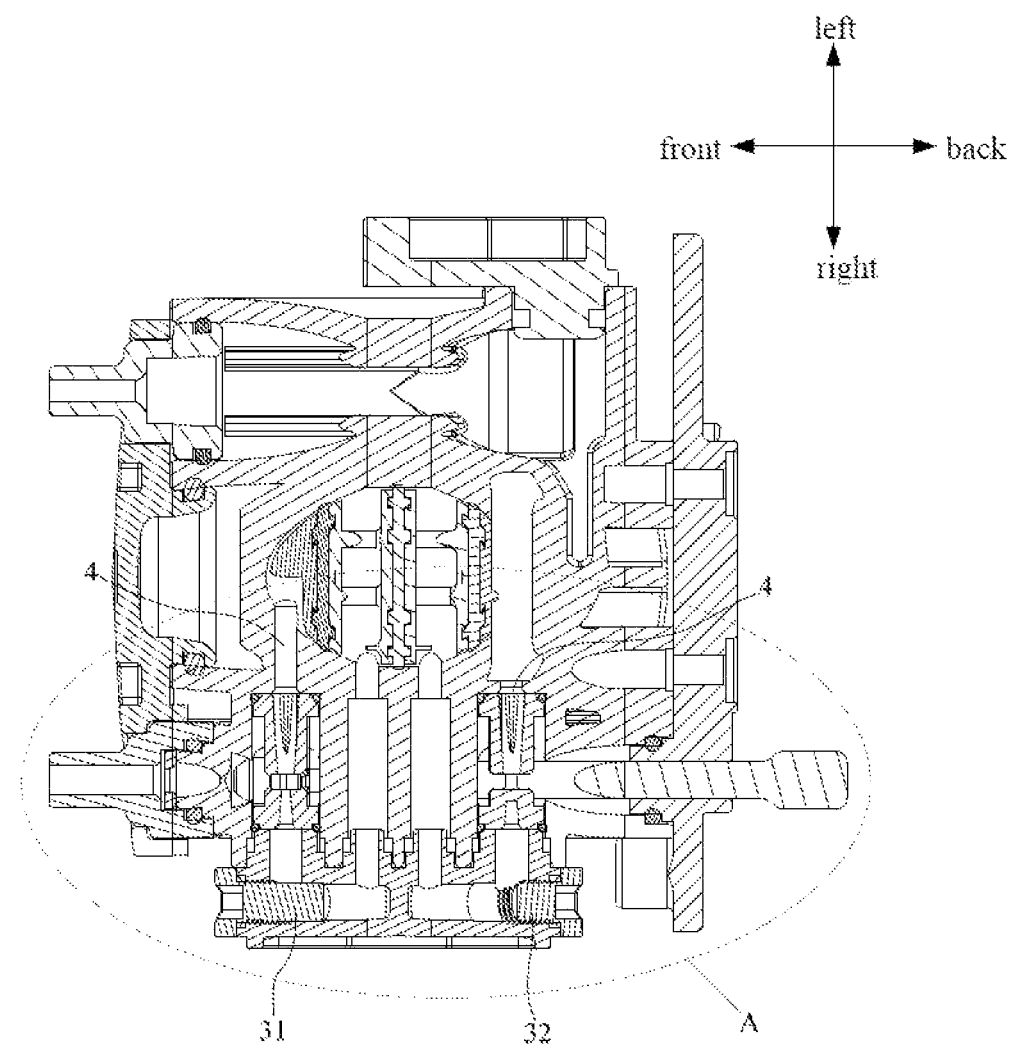
FIG. 18 is a schematic cross-sectional view taken along line IX-IX XVII-XVII in FIG. 17.
Figure 19:
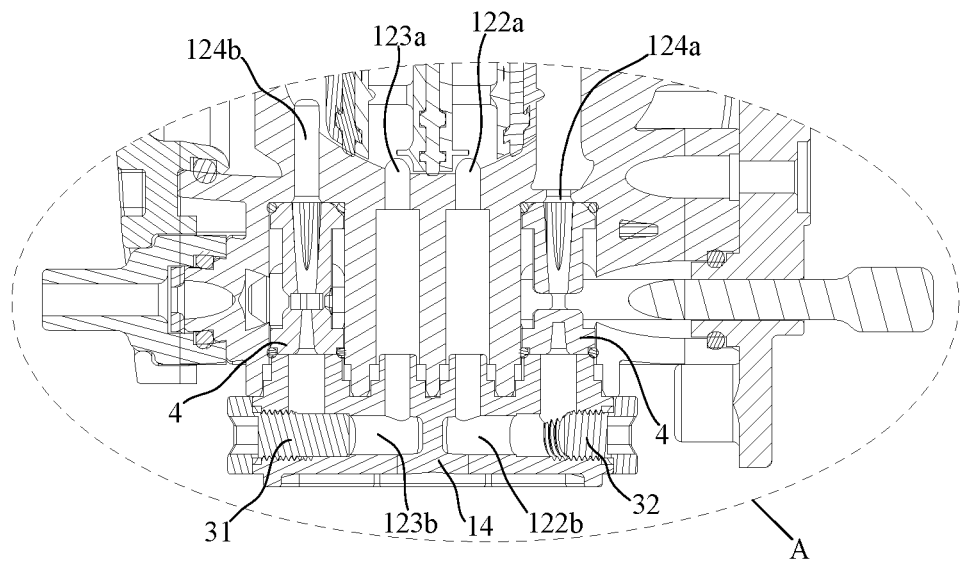
FIG. 19 is a partially enlarged view at A in FIG. 18.

Further, referring to FIGS. 17 to 19, in one embodiment, the ejecting passage (124a,124b) includes the forward washing ejecting passage 124a and the backwashing ejecting passage 124b, each communicating with the valve cavity 11; the forward washing ejecting passage 124a is connected with the forward washing passage 122, the backwashing ejecting passage 124b is connected with the backwashing passage 123, each outlet of the forward washing ejecting passage 124a and the backwashing ejecting passage 124b are communicated with the saline solution suction passage 125;

at the forward washing position, the valve core assembly is defined to communicate the forward washing ejecting passage 124a with the softening inlet passage 126; at the backwashing position, the valve core assembly is defined to communicate the backwashing ejecting passage 124b with the softening outlet passage 127;

when the valve core assembly is at the forward washing position, the switching unit 3 is defined to communicate the forward washing ejecting passage 124a with the forward washing passage 122; and to communicate the backwashing ejecting passage with the backwashing passage, when the valve core assembly is at the backwashing position.

In this embodiment, the ejecting passage (124a,124b) is defined as the independent forward washing ejecting passage 124a and the independent backwashing ejecting passage 124b. Correspondingly, appropriate ejectors may be selected and installed in the forward washing ejecting passage 124a and the independent backwashing ejecting passage 124b respectively, so as to exert advantages of the saline solution suction for forward washing and the saline solution suction for backwashing to the fullest, and combination of them exerts the maximum efficiency of the water softener integrally. In one embodiment, in order to facilitate the communication of the saline solution suction passage 125 and make the structure of the valve body 1 more compact, the forward washing passage 122, the backwashing passage 123, the forward washing ejecting passage 124a, and the backwashing ejecting passage 124b are located at the same side of the valve cavity 11, and are defined as adjacent to each other.

Figure 27:
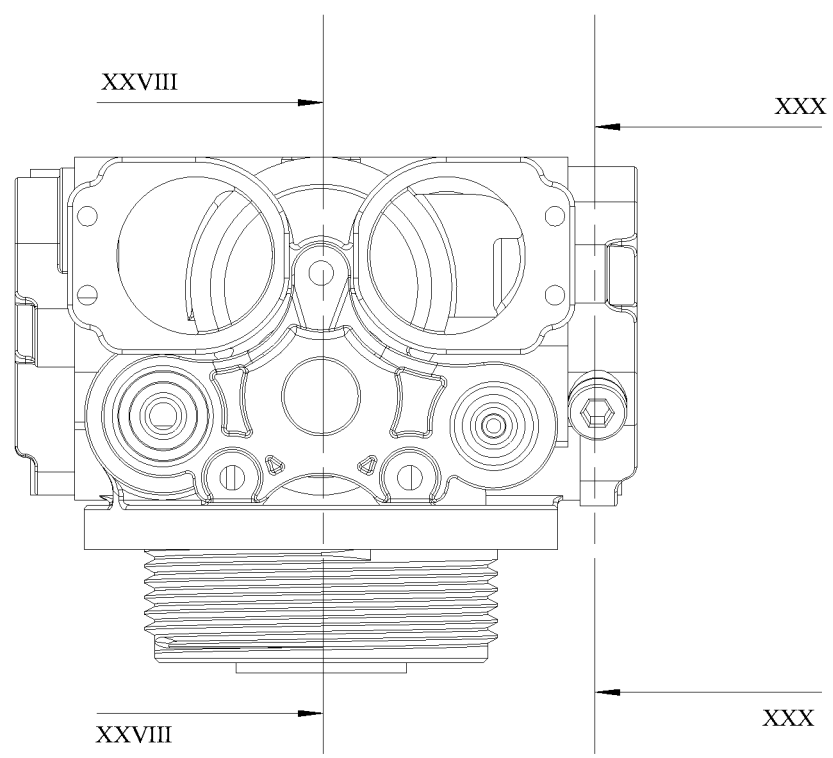
FIG. 27 is a schematic front view of the water softener valve of FIG. 1, the water softener valve is in a backwashing condition.
Figure 28:
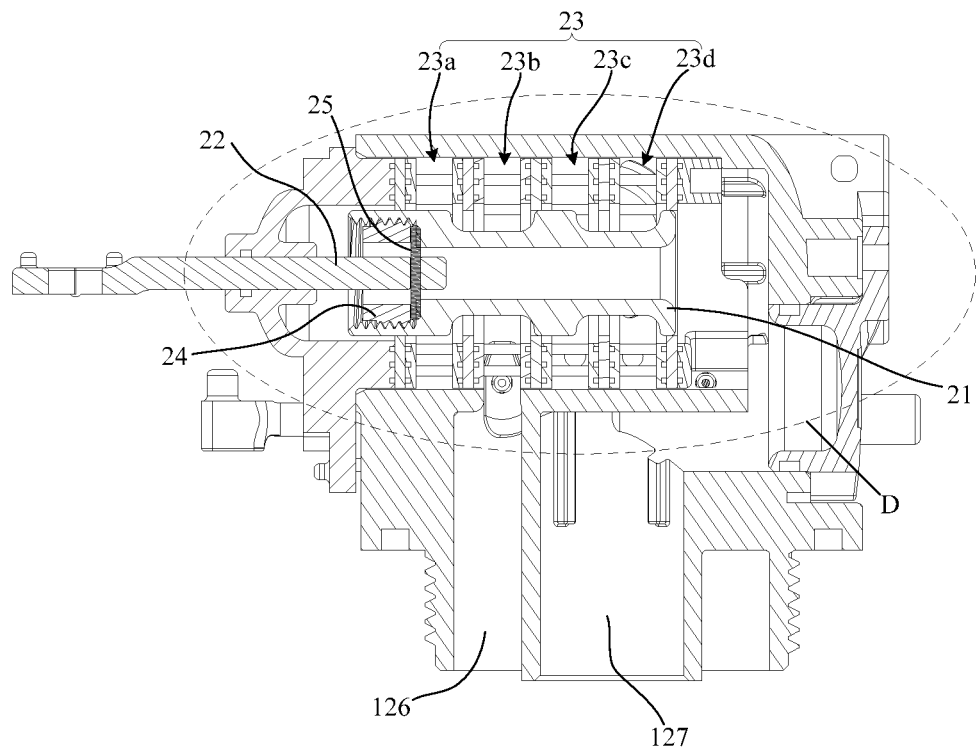
FIG. 28 is a schematic cross-sectional view taken along line XXVIII-XXVIII in FIG. 27
Figure 30:
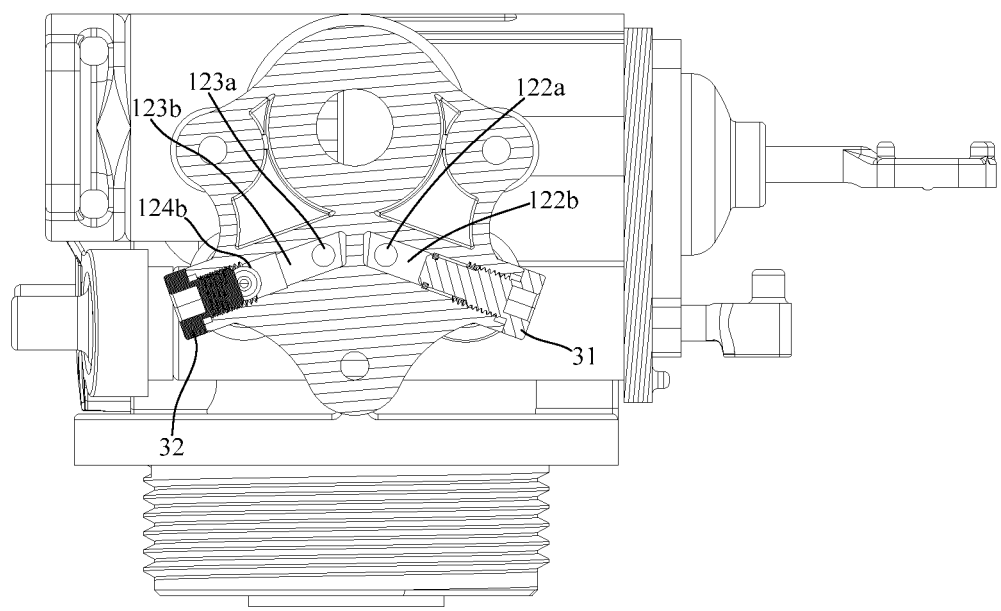
FIG. 30 is a schematic sectional view taken along the line XXX-XXX in FIG. 27.

Further, referring to FIGS. 27 and 30 in combination, in one embodiment, the forward washing passage 122 includes a forward passage 122a and a first by-pass passage 122b, the first by-pass passage 122b is connected with the forward washing ejecting passage 124a; the backwashing passage 123 includes a backward passage 123a and a second by-pass passage 123b, The second by-pass passage 123b is connected with the backwashing ejecting passage 124b;

the forward washing passage 122, the backwashing passage 123, the forward washing ejecting passage 124a, and the backwashing ejecting passage 124b are located at one side a first direction of the valve cavity respectively, the forward passage 122a, the backward passage 123a, the forward washing ejecting passage 124a, and the backwashing ejecting passage 124b all extend along the first direction;

when the valve core assembly is at the forward washing position, the switching unit 3 is defined to communicate the forward washing ejecting passage 124a and the first by-pass passage 122b; and to communicate the backwashing ejecting passage 124b and the second by-pass passage 123b, when the valve core assembly is at the backwashing position.

In this embodiment, as an example, the first direction is the same as the left-right direction in the figure, the forward passage 122a, the backward passage 123a, the forward washing ejecting passage 124a, and the backwashing ejecting passage 124b are defined in parallel, such definition is favorable for the movable member of the valve core assembly switching and communicating with different passages via simple translational movement or rotation. In one embodiment, the axes of the forward passage 122a, the backward passage 123a, the forward washing ejecting passage 124a, and the backwashing ejecting passage 124b are defined along a second direction and are arranged in intervals with each other, the second direction is perpendicular to the first direction; the valve core assembly 21 includes a valve core 21 and a valve rod 22, the valve rod 22 fixedly connected with the valve core 21 and extended out of the valve body 1, the valve rod 22 extends along the second direction, the valve core 21 moves forth and back following the valve rod 22. Thus, the movable member of the valve core assembly may switch and communicate with different passages via simple translational movement.

Further, referring to FIGS. 13 to 19 again, in one embodiment, at the second direction, the axes of the forward passage 122a and the backward passage 123a are located between the axes of the forward washing ejecting passage 124a and the backwashing ejecting passage 124b, and the axis of the forward passage 122a is located between the axes of the backward passage 123a and the forward washing ejecting passage 124a.

In this embodiment, as an example, the second direction is the same as the forward-backward direction in the figure, Via reasonable definition of the position of the forward passage 122a, the backward passage 123a, the forward washing ejecting passage 124a, and the backwashing ejecting passage 124b, the following steps can be accomplished. 1. the forward washing ejecting passage 124a and the backwashing ejecting passage 124b may be depart appropriately, so as to accommodate the large flux structure of the softening inlet passage 126 and the softening outlet passage 127; 2. the forward passage 122a and the backward passage 123a may be communicated with the water inlet passage 121 conveniently at a close position; 3. the forward passage 122a may be communicated with the forward washing ejecting passage 124a, the backward passage 123a may be communicated with the backwashing ejecting passage 124b, conveniently.

Further, referring to FIGS. 23 to 29, in one embodiment, the valve cavity 11 includes a peripheral surface, a first end surface 111, and a second end surface 112, the end surfaces are located at two ends of the peripheral surface of the valve cavity, The valve core 21 extends out of the valve body through the first end surface 111 via rod;

the valve core 21 is cylindrical, the peripheral surface of the valve core 21 is provided with a first sealing surface 211, a first annular groove 212, a second sealing surface 213, a second annular groove 214, and a third sealing surface 215, all of which are defined in sequence and along the direction close to the second end surface;

the valve core assembly further includes a groove defining assembly 23, the groove defining assembly 23 is sleeved on the periphery of the valve core 21, the groove defining assembly 23 includes a first water-passable grid 23a, a second water-passable grid 23b, a third water-passable grid 23c, and a fourth water-passable grid 23d, the grids are annular and sequentially defined along the direction close to the second end surface 112, the first water-passable grid 23a, the second water-passable grid 23b, the third water-passable grid 23c, and the fourth water-passable grid 23d are sealed at and fixedly cooperate with the peripheral surface of the valve cavity 11 adjacent to each other along the axis of the valve core 21;

the waste water passage 128 communicates with the valve cavity 11 at the first water-passable grid 23a, the forward washing ejecting passage 124a and the softening inlet passage 126 communicate with the valve cavity 11 respectively at the second water-passable grid 23b, The water inlet passage 121 and the forward washing ejecting passage 126 communicate with the valve cavity 11 respectively at the third water-passable grid 23c, the backwashing passage 123 communicates with the valve cavity 11 at the fourth water-passable grid 23d, the backwashing ejecting passage 124b and the softening outlet passage 127 communicate with the valve cavity 11 respectively at the position close to the second end surface 112;

an inner cavity of the valve core 21 communicates with the first water-passable grid 23a and the softening outlet passage 127 at the forward washing position, the first sealing surface 211 seals the second water-passable grid 23b, the first annular groove 212 communicates with the third water-passable grid 23c and the fourth water-passable grid 23d, the second sealing surface 213 seals and abut against the edge of the fourth water-passable grid 23d that is close to the second end surface 112;

the first sealing surface 211 seals the edge of the first water-passable grid 23a that is close to the first end surface 111, the first annular groove 212 communicates with the first water-passable grid 23a and the second water-passable grid 23b, the second sealing surface 213 seals and abut against the edge of the second water-passable grid 23b that is close to the second end surface 112; the second annular groove 214 communicates with the third water-passable grid 23c and the fourth water-passable grid 23d, the third sealing surface 215 seals and abut against the edge of the fourth water-passable grid 23d that is close to the second end surface 112.

In the present embodiment, the internal structure of the valve cavity 11 may be simplified correspondingly by defining the groove defining assembly 23 to block or communicate each passage. when the groove defining assembly 23 and the valve body 1 may be separated and manufactured separately, the difficulty of manufacture is reduced significantly.

Specifically, the valve core assembly also includes a fastening ring and a connecting pin, one end of the valve rod 22 that extending into the inner cavity of the valve core 21 is provided with a small hole fitting the connecting pin 25, one end of the valve core 21 facing the first end surface 111 is provided with a mounting hole; a step surface is formed between the mounting hole and the inner cavity of the valve core 21, the fastening ring 24 sleeves on the periphery of the valve core 21 and cooperates with the thread of the mounting hole, the connecting pin 25 exposes at two ends of the valve rod 22 and is located between the fastening ring 24 and the step surface.

Figure 25:
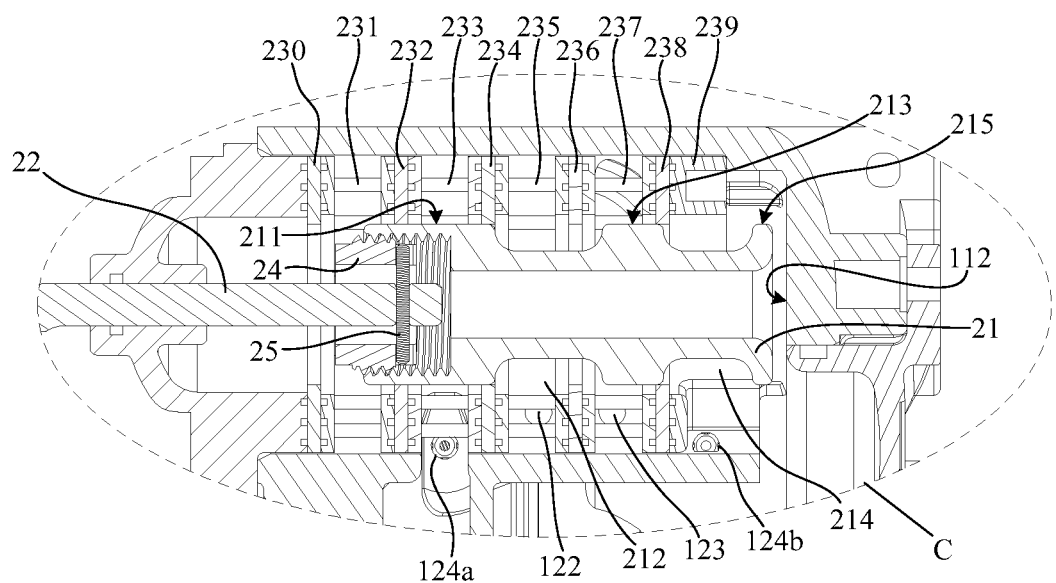
FIG. 25 is an enlarged partial view at C in FIG. 24.
Figure 26:
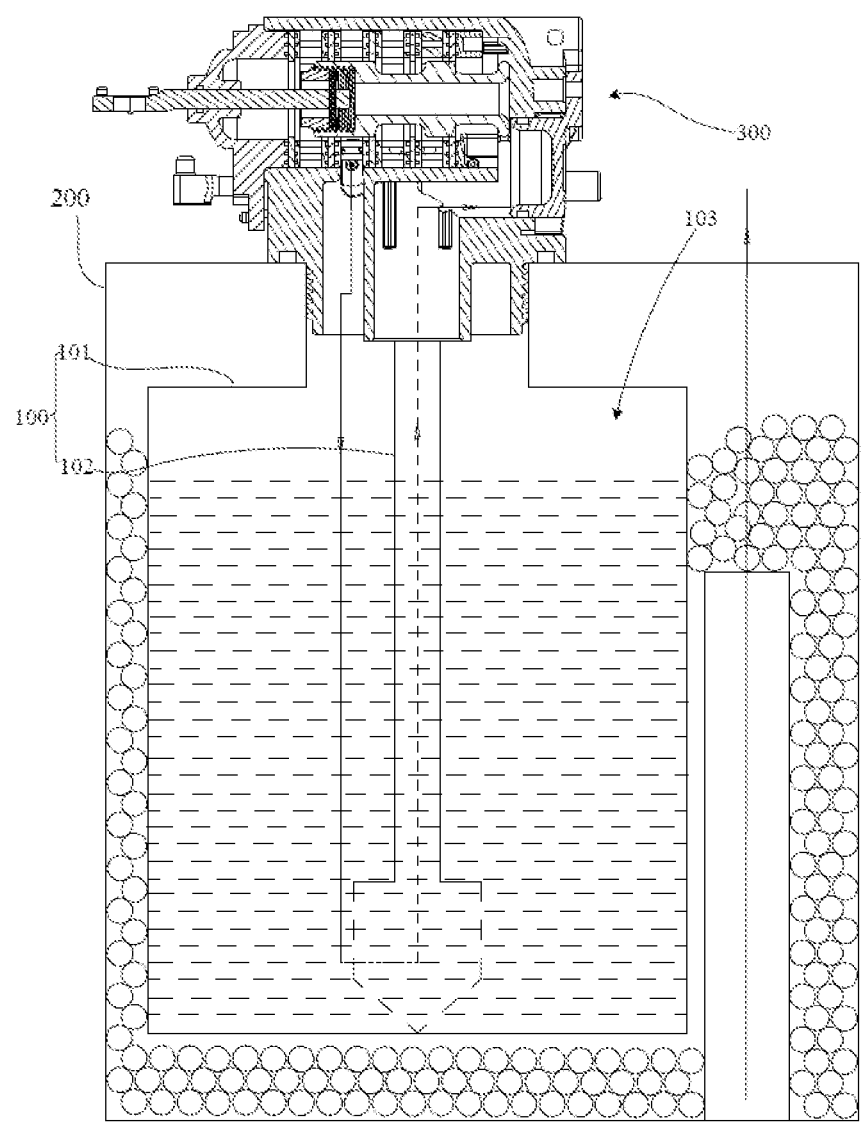
FIG. 26 is a schematic structural diagram of the water softener valve of FIG. 1 applied to the water softener of the present disclosure, the water softener valve is in a forward washing condition.

Please refer to FIG. 19, FIG. 25 and FIG. 26, when the water softener valve 300 is in the forward washing condition, water can flow along this path: water inlet passage 121→the third water-passable grid 23c→forward washing passage 122→forward washing ejecting passage 124a→the second water-passable grid 23b→softening inlet passage 126→ion exchange filter material (water softening resin) →central tube 102→softening outlet passage 127→inner cavity of valve core 21→the first water-passable grid 23a→the waste water passage 128→discharge.

Figure 29:
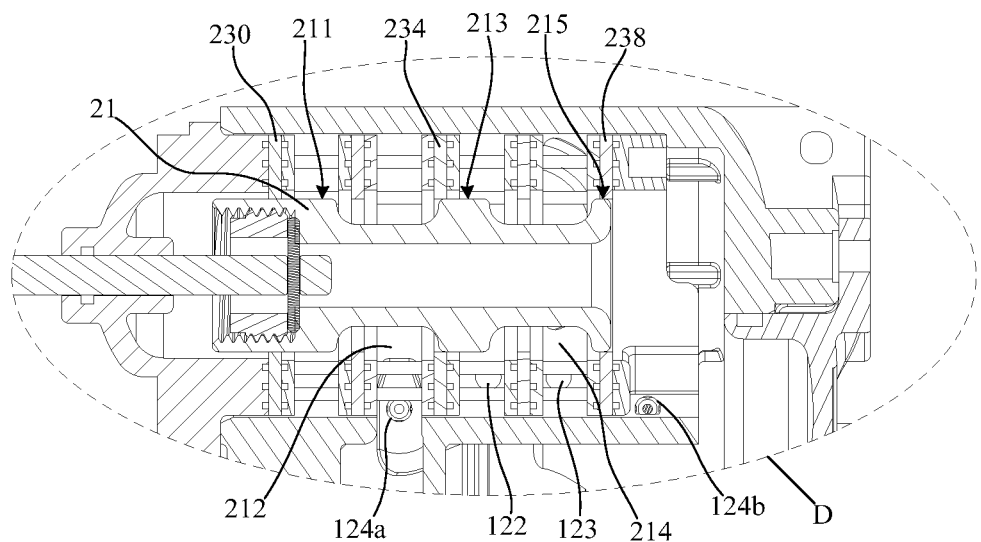
FIG. 29 is an enlarged partial view at D in FIG. 28.

Referring to FIGS. 29 and 30, when the water softener valve 300 is in backwashing condition, the flow path of water is: water inlet passage 121→the third water-passable grid 23c→the backwashing passage 123→backwashing ejecting passage 124b→softening outlet passage 127→central tube 102→ion exchange filter material (softening resin) →softening inlet passage 126→the second water-passable grid 23b→the first water-passable grid 23a→waste water passage 128→discharge.

In this embodiment, the softening process condition and the water injection condition of the saline solution tank 200 can also be realized via the cooperation of the valve core assembly and the water injection assembly, it will not be described in detail here. It should be noted that the water outlet passage 129 of the valve body 1 communicates with the valve cavity 11 at the fourth water water-passable grid 23d.

Further, please refer to FIGS. 3 to 5 and FIGS. 23 to 29. In one embodiment, the groove defining assembly 23 includes a first sealing ring 230, a first grid 231, a second sealing ring 232, a second grid 233, a third sealing ring 234, a third grid 235, a fourth sealing ring 236, a fourth grid 237 and a fifth sealing ring 238, being sequentially defined in the direction close to the second end surface 112;

the first sealing ring 230, the first grid 231 and the second sealing ring 232 enclose to form the first water-passable grid 23a, the second sealing ring 232, the second grid 233 and the third sealing ring 234 enclose to form the second water-passable grid 23b, the third sealing ring 234, the third grid 235 and the fourth sealing ring 236 enclose to form the third water-passable grid 23c, the fourth sealing ring 236, the fourth grid 237 and the fifth sealing ring 238 enclose to form the fourth water-passable grid 23d.

In this embodiment, the groove defining assembly 23 is provided with a plurality of sealing rings and grids, the sealing rings and the grids are defined as two-phase clamps, so as to form a plurality of the required water-passable grids with similar structure, further, the manufacturing cost may be reduced as a result, because the groove defining assembly 23 can be separated from the valve body 1 and be manufactured separately. In one embodiment, the first seal ring 230, the second seal ring 232, the third seal ring 234, the fourth seal ring 236, and the fifth seal ring 238 may be defined to have the same structure. similarly, the first grid 231, the second grid 233, the third grid 235, and the fourth grid 237 may also be defined to have the same structure, further, the production cost and the types of components of the water softener valve 300 may be reduced as a result.

The groove defining assembly 23 also includes an annular irregular grid 239, the irregular grid 239 is sandwiched between the fifth sealing ring 238 and the second end surface 112, and the irregular grid 239 is provided with a water-passable slot corresponding to the backwashing ejecting passage 124b and the softening outlet passage 127. The irregular grid 239 can position the components of the slot assembly 23 between the irregular grid 239 and the first end face 111.

Further, in a third direction perpendicular to the first direction and the second direction, the axis of the forward passage 122a and the axis of the backwashing ejecting passage 124a are defined to be offset from each other, the axis of the backward passage 123a and the axis of the backwashing ejecting passage 124b are defined to be offset from each other; the forward passage 122a is defined close to the forward washing ejecting passage 124a, the backward passage 123a is defined close to the backwashing ejecting passage 124b, the forward passage 122a is defined close to the backward passage 123a.

In the present embodiment, as an example, the third direction is the same as the up-down direction in the figure, thus, basing on that the forward passage 122a is communicated with the forward washing ejecting passage, and the backward passage 123a is communicated with the ejecting passage 124b for backwashing conveniently, further, the size may be reduced at the second direction, displacement required by switch of the movable component of the valve core assembly, i.e. the valve core 21, between a forward washing position and a backwashing position may be reduced, so as to improve the switching efficiency.

Further, the axis of the forward passage 122a and the axis of the backward passage 123a are located at a first plane, the first plane is perpendicular to the third direction, the axis of the forward washing ejecting passage 124a and the axis of the backwashing ejecting passage 124b are located at a second plane, the second plane is perpendicular to the third direction.

In this embodiment, in the same way, the size in the third direction can be reduced so that the corresponding structure is more compact. In one embodiment, the line between the axis of the forward passage 122a and the axis of the forward washing ejecting passage 124a, and the line between the axis of the backward passage 123a and the axis of the backwashing ejecting passage 124b are symmetrical about a plane that is perpendicular to the second direction.

Further, referring again to FIGS. 1 to 4, 17 to 19, 27 and 30, in one embodiment, the valve body 1 includes a main body 13 and a first end cap 14, a valve cavity 11 formed in the main body 13; the forward passage 122a, the backward passage 123a, the forward washing ejecting passage 124a, and the backwashing ejecting passage 124b all include an inner section, the inner section is formed in the main body 13 and is communicated with the valve cavity 11, the exterior section is formed in the first end cap 14;

the first end cap 14 is detachably covered to the body 13, making each of the exterior sections correspondingly connected with each of the inner sections; the first by-pass passage 122b and the second by-pass passage 123b are formed in the first end cap 14 respectively, the first by-pass passage 122b communicates with the exterior sections of the forward passage 122a and the forward washing ejecting passage 124a, the second by-pass passage 123b communicates with the exterior sections of the backward passage 123a and the backwashing ejecting passage 124b, In this embodiment, the valve body 1 is provided with the separate main body 13 and the end cap 14 (right end cap), so that the main body 13 and the end cap 14 can be molded separately, thereby reducing the processing difficulty. Similarly, in order to facilitate machining of the valve cavity 11 and each passages, the valve body 1 also includes a front end cap, a rear end cap and a left end cap that are covered with the body 13.

Further, the first by-pass passage 122b forms a first plug port 141 on the exterior side of the first end cap 14, the second by-pass passage 123b forms a second plug port 142 on the exterior side of the first end cap 14;

the switching unit 3 includes a long plug 31 and a short plug 32, when the valve core assembly is in the forward washing position, the long plug head 31 is defined to seal the second plug port 142 and block the exterior section of the backward passage 123a and/or the backwashing ejecting passage 124b, the short plug head 32 is defined to seal the first plug port 141. And, when the valve core assembly is in the backwashing position, the long plug 31 is defined to seal the first plug port 141 and block the exterior section of the forward passage 122a and/or the forward washing ejecting passage 124a, and the short plug 32 is defined to seal the second plug port 142.

In this embodiment, please refer to FIG. 19, when the valve core assembly is in the forward washing position, in one embodiment, the long plug head 31 seals the second plug port 142 and blocks the exterior section of the backward passage 123a and/or the backwashing ejecting passage 124b, avoiding water return back in the water inlet passage 121 via backwashing passage 123. while the short plug 32 seals only the first plug port 141. Referring to FIG. 30, when the valve core assembly is at the backwashing position, in one embodiment, the long plug 31 seals the first plug and blocks the exterior section of the forward washing ejecting passage 124a, while the short plug 32 seals only the second plug port 142. It should be understood that although according to the example, both the long plug 31 and the short plug 32 may be engaged to the first plug port 141 and the second plug port 142, two pairs of long plug and short plug may be provided to engaged respectively to the first plug port 141 and the second plug port 142.

Further, the exterior sections of the forward washing ejecting passage 124a and the backwashing ejecting passage 124b are both close to the exterior edge of the first end cap 14, so that the forward washing ejecting passage 124a or the backwashing ejecting passage 124b can be conveniently blocked according to requirement by the long plug 31 and the short plug 32. The first by-pass passage 122b and the second by-pass passage 123b both extend in a direction perpendicular to the first direction. In this way, the thickness of the required first end cap 14 can be reduced to make the overall structure of the valve body 1 more compact.

Further, when the valve core assembly is at the forward washing position, the long plug 31 is threadedly engaged with the second by-pass passage 123b, the short plug 32 is threadedly engaged with the first by-pass passage 122b; when the valve core assembly is at the backwash position, the long plug 31 is threadedly engaged with the first by-pass passage 122b, and the short plug 32 is threadedly engaged with the second bypass passage 123b.

In this embodiment, the long plug 31 and the short plug 32 are threadedly engaged with the first by-pass passage 122b, and the long plug 31 and the short plug 32 are threadedly engaged with the second by-pass passage 123b. After such assembly, the long plug 31 and the short plug 32 are not prone to be loosened under water pressure and result in a blocking failure.

The disclosure also provides a water softener, the water softener includes an ion exchange pot 100, a saline solution tank 200, a water softener valve 300. The specific structure of the water softener valve 300 refers to the above-mentioned embodiment. Since the water softener adopts all the technical solutions of all the above-mentioned embodiments, it has at least all the beneficial effects brought about by the technical solutions of the above-mentioned embodiments, these won't be repeated here.

The ion exchange tank 100 includes a pot body 101 and a central tube 102 disposed in the pot body 101. An ion exchange cavity 103 is formed between the central tube 102 and the inner wall of the pot body 101, a softening inlet passage 126 communicates with the ion exchange cavity 103, a softening outlet passage 127 communicates with the central tube 102, a saline solution suction passage 125 communicates with the saline solution tank 200.

In this embodiment, in order to increase the integrity and make the corresponding structure more compact, the pot 101 is disposed in the saline solution tank 200. The ion exchange filter material is softening water resin, so as to replace calcium ions and magnesium ions in the water to be treated with sodium ions easily, and finally discharge the calcium ions and magnesium ions through the waste water passage 128 during regeneration.

The above is only the preferred embodiment of the present disclosure, and is not therefore limiting the scope of the patent disclosure. Any equivalent structural change made under the inventive concept of the present disclosure using the contents of the present disclosure specification and drawings, or directly/indirectly applied in other related technical fields, is included in the scope of the patent protection of the present disclosure.

What is claimed is:

1. A water softener valve, comprising:
    a valve body, the valve body comprising a valve cavity, and a water inlet passage, a forward washing passage, a backwashing passage, and an ejecting passage all communicating with the valve cavity, a saline solution suction passage communicating with an ejection outlet of the ejecting passage, and a softening inlet passage, a softening outlet passage, and a waste water passage all communicating with the valve cavity; the forward washing passage and the backwashing passage both connecting with the ejecting passage;
    a valve core assembly, provided with a forward washing position and a backwashing position cooperated with the valve cavity, at the forward washing position, the valve core assembly being defined to communicate the water inlet passage with the forward washing passage, the ejecting passage with the softening inlet passage, and the softening outlet passage with the waste water passage; at the backwashing position, the valve core assembly being defined to communicate the water inlet passage with the backwashing passage, the ejecting passage with the softening outlet passage, and the softening inlet passage with the waste water passage; and
    a switching unit, defined to communicate the forward washing passage with the ejecting passage when the valve core assembly is at the forward washing position; and, to communicate the backwashing passage with the ejecting passage when the valve core assembly is at the backwashing position.

2. The water softener valve according to claim 1, wherein the ejecting passage comprises a forward washing ejecting passage and a backwashing ejecting passage which are both communicated with the valve cavity; the forward washing ejecting passage is connected with the forward washing passage, the backwashing ejecting passage is connected with the backwashing passage, each outlet of the forward washing ejecting passage and the backwashing ejecting passage is communicated with the saline solution suction passage;

at the forward washing position, the valve core assembly is further defined to communicate the forward washing ejecting passage with the softening inlet passage; and at the backwashing position, the valve core assembly is further defined to communicate the backwashing ejecting passage with the softening outlet passage;

the switching unit is defined to communicate the forward washing ejecting passage with the forward washing passage when the valve core assembly is at the forward washing position; and, to communicate the backwashing ejecting passage with the backwashing passage when the valve core assembly is at the backwashing position.

3. The water softener valve according to claim 2, wherein the forward washing passage, the backwashing passage, the forward washing ejecting passage, and the backwashing ejecting passage are all located at the same side of the valve cavity, and are defined as adjacent to each other.

4. The water softener valve according to claim 3, wherein the forward washing passage comprises a forward passage and a first by-pass passage, the first by-pass passage is connected with the forward washing ejecting passage; the backwashing passage comprises a backward passage and a second by-pass passage, the second by-pass passage is connected with the backwashing ejecting passage;

the forward washing passage, the backwashing passage, the forward washing ejecting passage, and the backwashing ejecting passage are all located at one side of the valve cavity along a first direction, the forward passage, the backward passage, the forward washing ejecting passage, and the backwashing ejecting passage all extend along the first direction, the switching unit is defined to communicate the forward washing ejecting passage with the first by-pass passage when the valve core assembly is at the forward washing position; and, to communicate the backwashing ejecting passage with the second by-pass passage when the valve core assembly is at the backwashing position.

5. The water softener valve according to claim 4, wherein the axes of the forward passage, the backward passage, the forward washing ejecting passage, and the backwashing ejecting passage are defined along a second direction and are arranged in interval with each other, the second direction is perpendicular to the first direction; the valve core assembly comprises a valve core and a valve rod fixedly connected with the valve core and extended out of the valve body, the valve rod extends along the second direction, the valve core moves forth and back following the valve rod.

6. The water softener valve according to claim 5, wherein at the second direction, the axes of the forward passage and the backward passage are located between the axes of the forward washing ejecting passage and the backwashing ejecting passage, and the axis of the forward passage is located between the axes of the backward passage and the forward washing ejecting passage.

7. The water softener valve according to claim 6, wherein the valve cavity comprises a peripheral surface, and a first end surface and a second end surface located at two ends of the peripheral surface of the valve cavity, the valve rod extends out of the valve body through the first end surface;

the valve core is cylindrical, the peripheral surface of the valve core is provided with a first sealing surface, a first annular groove, a second sealing surface, a second annular groove, and a third sealing surface, all of which are defined in sequence and along the direction close to the second end surface;

the valve core assembly further comprises a groove defining assembly, the groove defining assembly is sleeved on the periphery of the valve core, the groove defining assembly comprises a first water-passable grid, a second water-passable grid, a third water-passable grid, and a fourth water-passable grid, the first water-passable grid, the second water-passable grid, the third water-passable grid, and the fourth water-passable grid are sealed at and fixedly cooperate with the peripheral surface of the valve cavity adjacent to each other along the axis of the valve core;

the waste water passage communicates with the valve cavity at the first water-passable grid, both the forward washing ejecting passage and the softening inlet passage communicate with the valve cavity at the second water-passable grid, both the water inlet passage and the forward washing passage communicate with the valve cavity at the third water-passable grid; the backwashing passage communicates with the valve cavity at the fourth water-passable grid; both the backwashing ejecting passage and the softening outlet passage communicate with the valve cavity at the position close to the second end surface;

an inner cavity of the valve core communicates with the first water-passable grid and the softening outlet passage at the forward washing position, the first sealing surface seals the second water-passable grid, the first annular groove communicates with the third water-passable grid and the fourth water-passable grid, the second sealing surface seals and abut against the edge of the fourth water-passable grid that is close to the second end surface;

the first sealing surface seals the edge of the first water-passable grid that is close to the first end surface, the first annular groove communicates with the first water-passable grid and the second water-passable grid, the second sealing surface seals and abut against the edge of the second water-passable grid that is close to the second end surface; the second annular groove communicates with the third water-passable grid and the fourth water-passable grid, the third sealing surface seals and abut against the edge of the fourth water-passable grid that is close to the second end surface.

8. The water softener valve according to claim 7, wherein the groove defining assembly comprises a first sealing ring, a first grid, a second sealing ring, a second grid, a third sealing ring, a third grid, a fourth sealing ring, a fourth grid, and a fifth sealing ring, all of which are sequentially defined along the direction close to the second end surface;

the first sealing ring, the first grid, and the second sealing ring cooperatively form the first water-passable grid, the second sealing ring, the second grid, and the third sealing ring cooperatively form the second water-passable grid, the third sealing ring, the third grid, and the fourth sealing ring cooperatively form the third water-passable grid, and the fourth sealing ring, the fourth grid, and the fifth sealing ring cooperatively form the fourth water-passable grid.

9. The water softener valve according to claim 6, wherein the axis of the forward passage and the axis of the forward washing ejecting passage are defined to be offset from each other along a third direction, the third direction is perpendicular to the first direction and the second direction, the axis of the backward passage and the axis of the backwashing ejecting passage are defined to be offset from each other;

the forward passage is defined close to the forward washing ejecting passage, the backward passage is defined close to the backwashing ejecting passage, the forward passage is defined close to the backward passage.

10. The water softener valve according to claim 9, wherein the axis of the forward passage and the axis of the backward passage are located at a first plane, the first plane is perpendicular to the third direction, the axis of the forward washing ejecting passage and the axis of the backwashing ejecting passage are located at a second plane, the second plane is perpendicular to the third direction.

11. The water softener valve according to claim 4, wherein the valve body comprises a main body and a first end cap, the valve cavity is formed in the main body; the forward passage, the backward passage, the forward washing ejecting passage, and the backwashing ejecting passage comprise respectively an inner section and an exterior section, the inner section is formed in the main body and is communicated with the valve cavity, the exterior section is formed in the first end cap;

the first end cap detachedly covers the main body, making each of the exterior sections correspondingly connected with each of the inner sections; the first by-pass passage and the second by-pass passage are both formed in the first end cap, the first by-pass passage communicates with the exterior sections of the forward passage and the forward washing ejecting passage, the second by-pass passage communicates with the exterior sections of the backward passage and the backwashing ejecting passage.

12. The water softener valve according to claim 11, wherein the first by-pass passage forms a first plug port in the exterior side of the first end cap, the second by-pass passage forms a second plug port in the exterior side of the first end cap;

the switching unit comprises a long plug head and a short plug head, and when the valve core assembly is at the forward washing position, the long plug head is defined to seal the second plug port and block the exterior section of the backward passage and/or the backwashing ejecting passage, and the short plug head is defined to seal the first plug port; and, when the valve core assembly is at the backwashing position, the long plug head is defined to seal the first plug port and block the exterior section of the forward passage and/or the forward washing ejecting passage, and the short plug head is defined to seal the second plug port.

13. The water softener valve according to claim 12, wherein the exterior sections of the forward washing ejecting passage and the backwashing ejecting passage are both close to the exterior edge of the first end cap, the first by-pass passage and the second by-pass passage both extend along the direction perpendicular to the first direction.

14. The water softener valve according to claim 13, wherein when the valve core assembly is at the forward washing position, the long plug head cooperates with the second by-pass passage via threads, the short plug head cooperates with the first by-pass passage via threads; when the valve core assembly is at the backwashing position, the long plug head cooperates with the first by-pass passage via threads, the short plug head cooperates with the second by-pass passage via threads.

15. A water softener comprising:

an ion exchange pot, a saline solution tank, and a water softener valve; the water softener valve comprises:

a valve body, the valve body comprising a valve cavity, and a water inlet passage, a forward washing passage, a backwashing passage, and an ejecting passage all communicating with the valve cavity, a saline solution suction passage communicating with an ejection outlet of the ejecting passage, and a softening inlet passage, a softening outlet passage, and a waste water passage all communicating with the valve cavity; the forward washing passage and the backwashing passage both connecting with the ejecting passage;

a valve core assembly, provided with a forward washing position and a backwashing position cooperated with the valve cavity, at the forward washing position, the valve core assembly being defined to communicate the water inlet passage with the forward washing passage, the ejecting passage with the softening inlet passage, and the softening outlet passage with the waste water passage; at the backwashing position, the valve core assembly being defined to communicate the water inlet passage with the backwashing passage, the ejecting passage with the softening outlet passage, and the softening inlet passage with the waste water passage; and a switching unit, defined to communicate the forward washing passage with the ejecting passage when the valve core assembly is at the forward washing position; and, to communicate the backwashing passage with the ejecting passage when the valve core assembly is at the backwashing position;

the ion exchange pot comprises a pot body and a central tube disposed in the pot body, an ion exchange cavity being defined between the central tube and the inner wall of the pot body, the softening inlet passage is communicated with the ion exchange cavity, the softening outlet passage is communicated with the central tube, the saline solution suction passage is communicated with the saline solution tank.

16. The water softener according to claim 15, wherein the ejecting passage comprises a forward washing ejecting passage and a backwashing ejecting passage which are both communicated with the valve cavity; the forward washing ejecting passage is connected with the forward washing passage, the backwashing ejecting passage is connected with the backwashing passage, each outlet of the forward washing ejecting passage and the backwashing ejecting passage is communicated with the saline solution suction passage;

at the forward washing position, the valve core assembly is further defined to communicate the forward washing ejecting passage with the softening inlet passage; and at the backwashing position, the valve core assembly is further defined to communicate the backwashing ejecting passage with the softening outlet passage;

the switching unit is defined to communicate the forward washing ejecting passage with the forward washing passage when the valve core assembly is at the forward washing position; and, to communicate the backwashing ejecting passage with the backwashing passage when the valve core assembly is at the backwashing position.

17. The water softener according to claim 16, wherein the forward washing passage, the backwashing passage, the forward washing ejecting passage, and the backwashing ejecting passage are all located at the same side of the valve cavity, and are defined as adjacent to each other.

18. The water softener according to claim 17, wherein the forward washing passage comprises a forward passage and a first by-pass passage, the first by-pass passage is connected with the forward washing ejecting passage; the backwashing passage comprises a backward passage and a second by-pass passage, the second by-pass passage is connected with the backwashing ejecting passage;

the forward washing passage, the backwashing passage, the forward washing ejecting passage, and the backwashing ejecting passage are all located at one side of the valve cavity along a first direction, the forward passage, the backward passage, the forward washing ejecting passage, and the backwashing ejecting passage all extend along the first direction, the switching unit is defined to communicate the forward washing ejecting passage with the first by-pass passage when the valve core assembly is at the forward washing position; and, to communicate the backwashing ejecting passage with the second by-pass passage when the valve core assembly is at the backwashing position.

19. The water softener according to claim 18, wherein the valve body comprises a main body and a first end cap, the valve cavity is formed in the main body; the forward passage, the backward passage, the forward washing ejecting passage, and the backwashing ejecting passage comprise respectively an inner section and an exterior section, the inner section is formed in the main body and is communicated with the valve cavity, the exterior section is formed in the first end cap;

the first end cap detachedly covers the main body, making each of the exterior sections correspondingly connected with each of the inner sections; the first by-pass passage and the second by-pass passage are both formed in the first end cap, the first by-pass passage communicates with the exterior sections of the forward passage and the forward washing ejecting passage, the second by-pass passage communicates with the exterior sections of the backward passage and the backwashing ejecting passage.

20. The water softener according to claim 19, wherein the first by-pass passage forms a first plug port in the exterior side of the first end cap, the second by-pass passage forms a second plug port in the exterior side of the first end cap;

the switching unit comprises a long plug head and a short plug head, and when the valve core assembly is at the forward washing position, the long plug head is defined to seal the second plug port and block the exterior section of the backward passage and/or the backwashing ejecting passage, and the short plug head is defined to seal the first plug port; and, when the valve core assembly is at the backwashing position, the long plug head is defined to seal the first plug port and block the exterior section of the forward passage and/or the forward washing ejecting passage, and the short plug head is defined to seal the second plug port.

* * * * *